US00RE43961E

(19) United States
(12) Reissued Patent
Komma

(10) Patent Number: US RE43,961 E
(45) Date of Reissued Patent: Feb. 5, 2013

(54) OPTICAL HEAD DEVICE AND DIFFRACTIVE ELEMENT, OPTICAL INFORMATION APPARATUS, COMPUTER, DISC PLAYER, CAR NAVIGATION SYSTEM, OPTICAL DISC RECORDER AND VEHICLE

(75) Inventor: Yoshiaki Komma, Osaka (JP)

(73) Assignee: Panasonic Corporation, Osaka (JP)

(21) Appl. No.: 13/222,341

(22) Filed: Aug. 31, 2011

Related U.S. Patent Documents

Reissue of:
(64) Patent No.: 7,801,009
Issued: Sep. 21, 2010
Appl. No.: 11/892,464
Filed: Aug. 23, 2007

U.S. Applications:
(60) Provisional application No. 60/877,681, filed on Dec. 29, 2006.

(30) Foreign Application Priority Data

Aug. 25, 2006 (JP) ..... 2006-228631

(51) Int. Cl.
*G11B 7/00* (2006.01)

(52) U.S. Cl. ..... 369/112.07; 369/112.06; 369/44.37

(58) Field of Classification Search ..... None
See application file for complete search history.

(56) References Cited

U.S. PATENT DOCUMENTS

| | | | | |
|---|---|---|---|---|
| 6,282,164 | B1 | 8/2001 | Katayama | |
| 7,327,661 | B2 | 2/2008 | Ohnishi et al. | |
| 7,990,834 | B2 * | 8/2011 | Ueyama et al. | 369/112.06 |
| 2001/0036137 | A1 | 11/2001 | Katayama | |
| 2002/0181353 | A1 | 12/2002 | Katayama | |
| 2003/0012092 | A1 | 1/2003 | Katayama | |
| 2004/0081064 | A1 * | 4/2004 | Ohnishi et al. | 369/125 |
| 2004/0252620 | A1 | 12/2004 | Watanabe et al. | |
| 2005/0030877 | A1 | 2/2005 | Horiyama | |
| 2007/0053270 | A1 | 3/2007 | Ueyama et al. | |
| 2009/0022032 | A1 | 1/2009 | Kawasaki et al. | |

FOREIGN PATENT DOCUMENTS

| | | |
|---|---|---|
| JP | 7-098431 | 4/1995 |
| JP | 7-232303 | 9/1995 |
| JP | 7-272303 | 10/1995 |
| JP | 9-81942 | 3/1997 |
| JP | 11-134677 | 5/1999 |
| JP | 2000-145915 | 5/2000 |
| JP | 2001-307358 | 11/2001 |

(Continued)

OTHER PUBLICATIONS

Patent Cooperation Treaty (PCT) International Preliminary Report on Patentability, issued Mar. 4, 2009.

(Continued)

*Primary Examiner* — Joseph Haley
(74) *Attorney, Agent, or Firm* — Wenderoth, Lind & Ponack, L.L.P.

(57) ABSTRACT

In an optical head device responding to optical disc of different track pitches, an effect of both obtaining the tracking error signal by the optimum DPP method using a single diffractive element and suppressing the lowering amount in the amplitude of the tracking error signal in a state the object lens is moved by track following is obtained. In the optical head device, the grating phase of left and right regions of a sub-beam generating diffractive element differ from each other by 180 degrees. A central region of the sub-beam generating diffractive element has a grating pattern different from the left and right regions, and is divided into a plurality of regions to form different gratings different from each other.

27 Claims, 24 Drawing Sheets

FOREIGN PATENT DOCUMENTS

| | | |
|---|---|---|
| JP | 2003-51130 | 2/2003 |
| JP | 2004-86957 | 3/2004 |
| JP | 2004-95077 | 3/2004 |
| JP | 2004-145915 | 5/2004 |
| JP | 2005-4932 | 1/2005 |
| JP | 2005-317106 | 11/2005 |
| JP | 2006-004499 | 1/2006 |
| JP | 2007-35193 | 2/2007 |
| JP | 2007-141425 | 6/2007 |
| WO | 2004/097815 | 11/2004 |

OTHER PUBLICATIONS

International Search Report issued Sep. 18, 2007 in connection with PCT/JP2007/065438.
International Search Report issued Sep. 18, 2007.

* cited by examiner 31
3109
3103
+90°
3108
0°
3101
3104
-90°
180°
3102
Y
T
Z 33
32
34
G
L
G
L
G
Y
T
Z 4330
4130
4230

3350
3250
3450
G L G L G
Y
T
Z 3152B
3159
3153
3150
3151B
4350
4150
4250
3151
3158R
3158L
3152
3152A
3154
3151A
0°
180°
90°
-90°
90°
-90°
90°
180°
0°
Y
T
Z

OPTICAL HEAD DEVICE AND DIFFRACTIVE ELEMENT, OPTICAL INFORMATION APPARATUS, COMPUTER, DISC PLAYER, CAR NAVIGATION SYSTEM, OPTICAL DISC RECORDER AND VEHICLE

Matter enclosed in heavy brackets [ ] appears in the original patent but forms no part of this reissue specification; matter printed in italics indicates the additions made by reissue.

*This application is a reissue application of U.S. Pat. No. 7,801,009, issued Sep. 21, 2010.*

This application claims the benefit of U.S. Provisional Application No. 60/877,681, filed Dec. 29, 2006.

BACKGROUND OF THE INVENTION

1. Field of the Invention

The present invention relates to an optical information apparatus for reproducing information from an information recording medium represented by optical discs or recording information to the information recording medium; an optical head device for reproducing or recording information in the optical information apparatus; and information equipment and a system using the same. The present invention also relates to a diffractive element used therein.

2. Description of the Related Art

Since a digital versatile disc (DVD) can record digital information at a recording density of about six times the compact disc (CD), the DVD is known as an optical disc that can record large volume data. Recently, optical discs of larger volume are being desired because of an increase in the amount of information to be recorded on the optical disc. In order to achieve a large volume optical disc, the recording density of the information must be increased by reducing the optical spot formed by the light irradiated onto the optical disc when recording information on the optical disc and reproducing information recorded on the optical disc. Specifically, the optical spot can be reduced by using laser light having a short wavelength and increasing the numerical apertures (NA) of an objective lens. The wavelength of 660 nm (red) is used for the wavelength of the light source, and the objective lens having a numerical aperture (NA) of 0.6 is used in the DVD. Furthermore, in BD, the light source having a wavelength of 405 nm is used, and the objective lens having NA of 0.85 is used in order to achieve a recording density of five times the recording density of the current DVD.

In the optical information apparatus for realizing recordation and reproduction at high density using the laser of short wavelength by blue laser, the usability of the device is further enhanced by providing a compatibility function with an existing optical disc, and cost performance is also enhanced.

DVD-R having a track pitch of 0.74 μm and DVD-RAM for performing recording on both land (L) and groove (G) at 1.3 μm coexist in the DVD using red light source. Thus, it is important to stably perform track control on the optical disc of different track pitches even for equipment dedicated to use with a DVD, and in addition, compatibility with CD and BD is also desired.

To perform track control, the track shift amount must be detected, and the tracking error signal must be detected. One of the frequently used tracking error signal detection methods is a differential push-pull (DPP) method. The differential push-pull method is disclosed in patent document 1 (Japanese Laid-Open Patent Publication No. 7-272303), and will be described briefly using the figure.

FIG. 19 shows a configuration of an optical head device according to the prior art. The light beam 210 radiated from a light source 201 is transmitted through a diffraction grating 204. The diffraction grating 204 produces a conjugate diffracted light. The transmitted main beam and the diffracted sub-beam are converted to parallel light by a collimator lens 203. An objective lens 205 converges the main beam and the pair of sub-beams, which are parallel light, on a recording surface of the optical disc 227. The light reflected from the optical disc follows the same optical path in the opposite direction and enters a light detector 266. The objective lens is moved in the tracking direction based on the tracking error signal obtained from the light detector 266 to perform track control. The configuration of the diffraction grating used in FIG. 19 is shown in schematic form in FIGS. 20A and 20B. FIG. 20A is a front view and FIG. 20B is a cross sectional view. The diffraction grating 204 is obtained by periodically forming concave-convex parts on a surface of a transparent base material such as glass, as shown in FIG. 20B. For simplicity, only the center line of a convex part is shown in the front view of FIG. 20A. In the present application, unless particularly stated, only the center line of the concave part will be shown in other figures for simplicity when showing the concave-convex shape in front view. When the light beam is transmitted through the diffraction grating 204, conjugate±one-dimensional diffracted light is generated, and converged on the recording surface of the optical disc 227 as main beam 211 and a pair of sub-beams 212, 213 by the objective lens 205 as shown in FIG. 21. The recordable optical disc such as DVD-RAM has concave-convex grooves on the recording surface thereof. The concave-convex is referred to as land (L) and groove (G). The diffraction grating 204 is rotation adjusted as in the arrow of FIG. 20A so that when the main beam 211 converges on a certain groove, the sub-beams 212, 213 converge on the adjacent lands. When the push-pull signal generated by diffraction at the disc groove is detected from the main beam and the sub-beams reflected and returned from the disc, the positive and negative signs of the push-pull signal become opposite for the main beam and the sub-beams. The tracking error signal of push-pull signal method is detected through differential calculation of the push-pull signal of the sub-beams and the push-pull signal of the main beam. In this method, the distance in the tracking (T) direction of the main beam and the sub-beams must be equal to the inter-center distance of the land and the groove, that is, half of the track pitch, and thus the amplitude of the tracking error signal lowers when applied to the optical disc of different track pitches such as DVD-RAM and DVD-R.

The diffraction grating developed to overcome such problem is shown in FIG. 22A (patent document 2: Japanese Laid-Open Patent Publication No. 9-81942). As shown in FIG. 22A, the diffraction grating 224 is divided in half by a dividing line parallel to the groove direction Y. Assuming the grating phase of the first diffraction grating region 2241 on the left side of the figure is the reference (0 degree), the grating phase of the second diffraction grating region 2242 on the right side of the figure is 180 degrees. The shift of the grating phase in the T direction is positive. The sub-beams are symmetrically divided in half as shown in FIG. 22B. The sub-beams 222 and 223 are arranged on the same groove as the main beam 221. In this case, the push-pull signals obtained from the sub-beams 222 and 223 have opposite signs from the main beam 221. Thus, the tracking error signal of the push-pull signal method is detected by the differential calculation of the push-pull signal of the sub-beams and the push-pull signal of the main beam. In this method, arrangement is made such that the distance in the tracking (T) direction of the main beam and the sub-beams becomes 0, and thus the amplitude of the tracking error signal does not lower from the difference in discs even when applied to the optical discs having different track pitches such as DVD-RAM and DVD-R. However, when the objective lens moves in the tracking (T) direction by track following, the amplitude of the tracking error signal at the destination lowers.

Furthermore, a method contrived to avoid lowering in amplitude of the tracking error signal by the movement of the objective lens is disclosed in patent document 3 (Japanese Laid-Open Patent Publication No. 2000-145915) and patent document 4 (Japanese Laid-Open Patent Publication No. 2006-4499). As shown in FIG. 23A, a third diffraction grating region 2343 having a phase of 90 degrees is arranged between the first diffraction grating 2341 having a phase of 0 degrees and the second diffraction grating region 2342 having a phase of 180 degrees. The amplitude of the signal in a state the objective lens is not moved by track following is lowered in advance, and the lowering in amplitude of the tracking error signal in a state the objective lens is moved is relatively avoided by arranging a different region in the middle.

SUMMARY OF THE INVENTION

In the diffraction grating shown in FIG. 23A, the phase is changed in a step form of 0 degrees, 90 degrees, and 180 degrees in order from the left side of the figure. The diagonal diffraction grating shown with a double chain dashed line in FIG. 24 becomes the main component, and the sub-beams have unequal light intensity between left and right as shown in FIG. 23B. As shown in FIG. 24B, the positional relationship of the portion where the intensity of the sub-beam is strong and the track groove must be optimally adjusted in order to maximize the DPP signal. That is, similar to the method using the diffraction grating shown in FIGS. 20A and 20B, the optimum adjustment position (rotational angle) of the diffraction grating differs depending on the track pitch of the optical pitch, and a stable tracking error signal becomes difficult to obtain.

Therefore, at the present time, a method of satisfying both obtaining the tracking error signal by an optimum DPP method with respect to the optical discs having different track pitches using a single diffraction grating and suppressing the lowering amount in the amplitude of the tracking error signal in a state the objective lens is moved by track following is not proposed.

In view of solving the above problems, it is an object of the present invention to provide an optical head device and a diffraction grating capable of obtaining the tracking error signal by the optimum DPP method with respect to the optical discs having different track pitches using a single diffractive element and suppressing the lowering amount in the amplitude of the tracking error signal in a state the objective lens is moved by track following; an optical information apparatus; a computer; a disc player; a car navigation system; an optical disc recorder; and a vehicle.

In order to achieve the above aims, the present invention has the following configurations. The first aspect of the present invention provides an optical head device comprising a light source, a diffractive element for branching a light exit from the light source into at least three light fluxes including a main beam that is transmitted without being diffracted and two sub-beams that are diffracted, an objective lens for converging the three light fluxes on a recording surface of an optical disc, and a light detector for receiving the light converged on the recording surface of the optical disc by the objective lens and reflected by the optical disc and photoelectric converting the light to an electrical signal; wherein the diffractive element is divided into a first diffraction grating region, a second diffraction grating region formed with a second diffraction grating having a phase differing by substantially 180 degrees from a first diffraction grating arranged in the first diffraction grating region, and a central region sandwiched by the first diffraction grating region and the second diffraction grating region;

the central region is further divided into a plurality of divided regions by a virtual dividing line; and the central region has phases or grating vectors different from the first diffraction grating region and the second diffraction grating region, and the divided regions divided by the dividing line are formed with diffraction gratings having different [phase and grating vector] *phases or grating vectors* from each other.

The second aspect of the present invention provides the optical head device of the first aspect, wherein the dividing line for dividing the central region extends in a direction orthogonal to an extending direction of a track groove of the optical disc.

The third aspect of the present invention provides the optical head device of the first aspect, wherein the central region is divided into three or more divided regions.

The fourth aspect of the present invention provides the optical head device of the third aspect, wherein diffraction gratings having different phases from each other are formed in two divided regions of the three or more divided regions of the central region; and a diffraction grating of the same grating vector and the same phase as the diffraction grating formed in one of the two divided regions is formed in the at least one divided region of a remaining divided region.

The fifth aspect of the present invention provides the optical head device of the first aspect, wherein when the phase of the first diffraction grating formed in the first diffraction grating region is 0 degrees as a reference, the phase of a third diffraction grating formed in the divided region obtained by dividing the central region and the phase of a fourth diffraction grating formed in another divided region have opposite polarities but the same absolute value.

The sixth aspect of the present invention provides the optical head device of the fifth aspect, wherein when the phase of the first diffraction grating formed in the first divided region is 0 degrees as a reference, the phase of the third diffraction grating is 90 degrees, and the phase of the fourth diffraction grating is −90 degrees.

The seventh aspect of the present invention provides the optical head device of the first aspect, wherein when the phase of the first diffraction grating formed in the first diffraction grating region is 0 degrees as a reference, the phase of each diffraction grating formed in each divided region of the central region is substantially 0 degrees on average.

The eighth aspect of the present invention provides the optical head device of the third aspect, wherein when the phase of the first diffraction grating formed in the first divided region is 0 degrees as a reference, the central region is divided into four or more divided regions, and includes a diffraction grating having a phase of −120 degrees, a diffraction grating having a phase of −60 degrees, a diffraction grating having a phase of +60 degrees, and a diffraction grating having a phase of +120 degrees.

The ninth aspect of the present invention provides an optical head device comprising a light source, a diffractive element for branching a light exit from the light source into at least three light fluxes, an objective lens for converging the three light fluxes on a recording surface of an optical disc, and a light detector for receiving the light converged on the recording surface of the optical disc by the objective lens and reflected by the optical disc and photoelectric converting the light to an electrical signal; wherein the diffractive element is divided into a first diffraction grating region, a second diffraction grating region formed with a second diffraction grating having a phase differing by substantially 180 degrees from a first diffraction grating arranged in the first diffraction grating region, and a central region sandwiched by the first diffraction grating region and the second diffraction grating region; and a diffraction grating having a direction different from the first diffraction grating and the second diffraction grating is formed in the central region.

The tenth aspect of the present invention provides the optical head device of the ninth aspect, wherein a third diffraction grating formed in the divided region obtained by dividing the central region and a fourth diffraction grating formed in another divided region are diffraction gratings having a direction different from the first diffraction grating and the second diffraction grating and have an angle formed with an extending direction of a track groove of the optical disc of opposite signs with respect to each other.

The eleventh aspect of the present invention provides an optical head device comprising a light source, a diffractive element for branching a light exit from the light source into at least three light fluxes, an objective lens for converging the three light fluxes on a recording surface of an optical disc, and a light detector for receiving the light converged on the recording surface of the optical disc by the objective lens and reflected by the optical disc and photoelectric converting the light to an electrical signal; wherein the diffractive element is divided into a first diffraction grating region, a second diffraction grating region formed with a second diffraction grating having a phase differing by substantially 180 degrees from a first diffraction grating arranged in the first diffraction grating region, and a central region sandwiched by the first diffraction grating region and the second diffraction grating region; and a diffraction grating having a grating pitch different from the first diffraction grating and the second diffraction grating is formed in the central region.

The twelfth aspect of the present invention provides the optical head device of the tenth aspect, wherein a diffraction grating formed in the central region is a diffraction grating having a smaller grating pitch than the first diffraction grating and the second diffraction grating.

The thirteenth aspect of the present invention provides the optical head device of the first aspect, wherein the width of the central region is 10% to 40% of a projection diameter on the diffractive element of an effective diameter of the objective lens.

The fourteenth aspect of the present invention provides the optical head device of the first aspect, wherein the light source is a two wavelength light source for emitting a red light and an infrared light.

The fifteenth aspect of the present invention provides the optical head device of the fourteenth aspect, wherein the width of the central region is less than or equal to 30% of a projection diameter on the diffractive element of an opening effective diameter of the objective lens.

The sixteenth aspect of the present invention provides the optical head device of any one of the first, ninth and eleventh aspects, further comprising a blue light source.

The seventeenth aspect of the present invention provides a diffractive element mounted on an optical head device including a light source, an objective lens for converging a light exit from the light source on a recording surface of an optical disc, and a light detector for receiving the light converged on the recording surface of the optical disc by the objective lens and reflected by the optical disc and photoelectric converting the light to an electrical signal, the diffractive element branching the light exit from the light source into at least three light fluxes including a main beam that is transmitted without being diffracted and two sub-beams that are diffracted; wherein the diffractive element is divided into a first diffraction grating region, a second diffraction grating region formed with a second diffraction grating having a phase differing by substantially 180 degrees from a first diffraction grating arranged in the first diffraction grating region, and a central region sandwiched by the first diffraction grating region and the second diffraction grating region; and the central region has phases or grating vectors different from the first diffraction grating region and the second diffraction grating region, and the divided regions divided by the dividing line are formed with diffraction gratings having different [phase and grating vector] *phases or grating vectors* from each other.

The eighteenth aspect of the present invention provides the diffractive element of the 17th aspect, wherein the dividing line for dividing the central region extends in a direction orthogonal to an extending direction of a track groove of the optical disc.

The nineteenth aspect of the present invention provides the diffractive element of the 17th aspect, wherein the central region is divided into three or more divided regions.

The twentieth aspect of the present invention provides the diffractive element of the 19th aspect, wherein diffraction gratings having different phases from each other are formed in two divided regions of the three or more divided regions of the central region; and a diffraction grating of the same grating vector and the same phase as the diffraction grating formed in one of the two divided regions is formed in the at least one divided region of a remaining. divided region.

The twenty-first aspect of the present invention provides the diffractive element of the 17th aspect, wherein when the phase of the first diffraction grating formed in the first diffraction grating region is 0 degrees as a reference, the phase of a third diffraction grating formed in the divided region obtained by dividing the central region and the phase of a fourth diffraction grating formed in another divided region have opposite polarities but the same absolute value.

The twenty-second aspect of the present invention provides the diffractive element of the 21st aspect, wherein when the phase of the first diffraction grating formed in the first divided region is 0 degrees as a reference, the phase of the third diffraction grating is 90 degrees, and the phase of the fourth diffraction grating is −90 degrees.

The twenty-third aspect of the present invention provides the diffractive element of the 17th aspect, wherein when the phase of the first diffraction grating formed in the first diffraction grating region is 0 degrees as a reference, the phase of each diffraction grating formed in each divided region of the central region is substantially 0 degrees on average.

The twenty-fourth aspect of the present invention provides the diffractive element of the 20th aspect, wherein when the phase of the first diffraction grating formed in the first divided region is 0 degrees as a reference, the central region is divided into four or more regions, and includes a diffraction grating having a phase of −120 degrees, a diffraction grating having a phase of −60 degrees, a diffraction grating having a phase of +60 degrees, and a diffraction grating having a phase of +120 degrees.

The twenty-fifth aspect of the present invention provides a diffractive element mounted on an optical head device including a light source, an objective lens for converging a light exit from the light source on a recording surface of an optical disc, and a light detector for receiving the light converged on the recording surface of the optical disc by the objective lens and reflected by the optical disc and photoelectric converting the light to an electrical signal, the diffractive element branching the light exit from the light source into at least three light fluxes including a main beam that is transmitted without being diffracted and two sub-beams that are diffracted; wherein the diffractive element is divided into a first diffraction grating region, a second diffraction grating region formed with a second diffraction grating having a phase differing by substantially 180 degrees from a first diffraction grating arranged in the first diffraction grating region, and a central region sandwiched by the first diffraction grating region and the second diffraction grating region; and a diffraction grating having a direction different from the first diffraction grating and the second diffraction grating is formed in the central region.

The twenty-sixth aspect of the present invention provides the diffractive element of the 25th aspect, wherein a third diffraction grating formed in the divided region obtained by dividing the central region and a fourth diffraction grating formed in another divided region are diffraction gratings having a direction different from the first diffraction grating and the second diffraction grating and have an angle formed with an extending direction of a track groove of the optical disc of opposite signs with respect to each other.

The twenty-seventh aspect of the present invention provides a diffractive element mounted on an optical head device including a light source, an objective lens for converging a light exit from the light source on a recording surface of an optical disc, and a light detector for receiving the light converged on the recording surface of the optical disc by the objective lens and reflected by the optical disc and photoelectric converting the light to an electrical signal, the diffractive element branching the light exit from the light source into at least three light fluxes including a main beam that is transmitted without being diffracted and two sub-beams that are diffracted; wherein the diffractive element is divided into a first diffraction grating region, a second diffraction grating region formed with a second diffraction grating having a phase differing by substantially 180 degrees from a first diffraction grating arranged in the first diffraction grating region, and a central region sandwiched by the first diffraction grating region and the second diffraction grating region; and a diffraction grating having a grating pitch different from the first diffraction grating and the second diffraction grating is formed in the central region.

The twenty-eighth aspect of the present invention provides the diffractive element of the 27th aspect, wherein a diffraction grating formed in the central region is a diffraction grating having a smaller grating pitch than the first diffraction grating and the second diffraction grating.

The twenty-ninth aspect of the present invention provides an optical information apparatus comprising:

the optical head device according to any one of first to 16th aspects;

a motor for rotating an optical disc; and an electric circuit for receiving a signal obtained from the optical head device, and controlling and driving the motor, an optical lens, and a laser light source based on the signal.

The thirtieth aspect of the present invention provides the optical information apparatus of the 29th aspect, wherein a push-pull signal obtained by receiving the sub-beam at the light detector and calculating through photoelectric conversion is amplified at an amplification factor K1, and subtracted with a push-pull signal obtained by receiving the sub-beam at the light detector and being processed through photoelectric conversion to be used as a tracking error signal; and the amplification factor K1 is fixed after being adjusted to a value in which change in tracking control signal becomes smaller when the objective lens is moved in a direction perpendicular to an extending direction of a track groove of the optical disc.

The thirty-first aspect of the present invention provides the optical information apparatus of the 29th aspect, wherein a focus error signal obtained by receiving the sub-beam at the light detector and calculating through photoelectric conversion is amplified at an amplification factor K2, and added with a focus error signal obtained by receiving the sub-beam at the light detector and being processed through photoelectric conversion to be used as a focus error signal for focus control.

The thirty-second aspect of the present invention provides a computer comprising:

the optical information apparatus of the 29th aspect;

an input device or an input terminal for inputting the information;

an arithmetic device for performing an arithmetic operation based on information input from the input device or information reproduced from the optical information apparatus; and an output device or an output terminal for displaying or outputting the information input from the input device or the information reproduced from the optical information apparatus, or result of arithmetic performed by the arithmetic device.

The thirty-third aspect of the present invention provides an optical disc player comprising:

the optical information apparatus of the 29th aspect; and an information-image decoder for converting information signal obtained from the optical information apparatus to an image.

The thirty-fourth aspect of the present invention provides a car navigation system comprising:

the optical information apparatus of the 29th aspect;

an information-image decoder for converting information signal obtained from the optical information apparatus to an image; and a position sensor.

The thirty-fifth aspect of the present invention provides an optical disc recorder comprising:

the optical information apparatus of the 29th aspect; and an image-information encoder for converting image information to information to be recorded by the optical information apparatus.

The thirty-sixth aspect of the present invention provides a vehicle comprising the optical information apparatus of the 29th aspect, a vehicle body mounted with the optical information apparatus, and a power generating unit for generating power to move the vehicle body.

According to the thirty-seventh aspect of the present invention, an optical head device including a light source, a diffractive element for branching a light exit from the light source into at least three light fluxes including a main beam that is transmitted without being diffracted and two sub-beams that are diffracted, an objective lens for converging the three light fluxes on a recording surface of an optical disc, and a light detector for receiving the light converged on the recording surface of the optical disc by the objective lens and reflected by the optical disc and photoelectric converting the light to an electrical signal; wherein the diffractive element includes a first divided region, a second divided region, a third divided region, and a fourth divided region; a first diffraction grating is formed in the first divided region; a second diffraction grating having a phase differing by substantially 180 degrees from the first diffraction grating is formed in the second divided region; a third diffraction grating having a phase differing by substantially −90 degrees from the first diffraction grating is formed in the third divided region; and a fourth diffraction grating having a phase differing by substantially +90 degrees from the first diffraction grating is formed in the fourth divided region is provided.

According to the thirty-eighth aspect of the present invention, a diffractive element used in an optical head including a light source, a diffractive element for branching a light exit from the light source into at least three light fluxes including a main beam that is transmitted without being diffracted and two sub-beams that are diffracted, an objective lens for converging the three light fluxes on a recording surface of an optical disc, and a light detector for receiving the light converged on the recording surface of the optical disc by the objective lens and reflected by the optical disc and photoelectric converting the light to an electrical signal; wherein the diffractive element includes a first divided region, a second divided region, a third divided region, and a fourth divided region; a first diffraction grating is formed in the first divided region; a second diffraction grating having a phase differing by substantially 180 degrees from the first diffraction grating is formed in the second divided region; a third diffraction grating having a phase differing by substantially −90 degrees from the first diffraction grating is formed in the third divided region; and a fourth diffraction grating having a phase differing by substantially +90 degrees from the first diffraction grating is formed in the fourth divided region is provided.

According to the configuration of the present invention, an effect of both obtaining the tracking error signal by the optimum DPP method with respect to the optical disc of different track pitches using a single diffractive element and suppressing the lowering amount in the amplitude of the tracking error signal in a state the object lens is moved by track following is obtained.

That is, the amplitude of the signal in a state the objective lens is not moved by track following is reduced in advance and the lowering in amplitude of the tracking error signal in a state the objective lens is moved is relatively avoided by arranging divided regions forming diffraction gratings different from the diffraction gratings of the first diffraction grating region and the second diffraction grating region in a central region sandwiched by the first diffraction grating region and the second diffraction grating region. Furthermore, the phase is prevented from changing in step-form over the entire surface of the diffraction grating by dividing the central region sandwiched by the first diffraction grating region and the second diffraction grating region into a plurality of divided regions and arranging diffraction gratins having phases different from each other, where the respective sub-beam has a light amount distribution line symmetric in a direction (tracking direction) of moving the optical head with respect to a symmetric line in a direction substantially parallel to the projection in the track extending direction of the optical disc.

BRIEF DESCRIPTION OF THE DRAWINGS

These and other aspects and features of the present invention will become clear from the following description taken in conjunction with the preferred embodiments thereof with reference to the accompanying drawings in which.

DETAILED DESCRIPTION OF THE INVENTION

Figure 1:
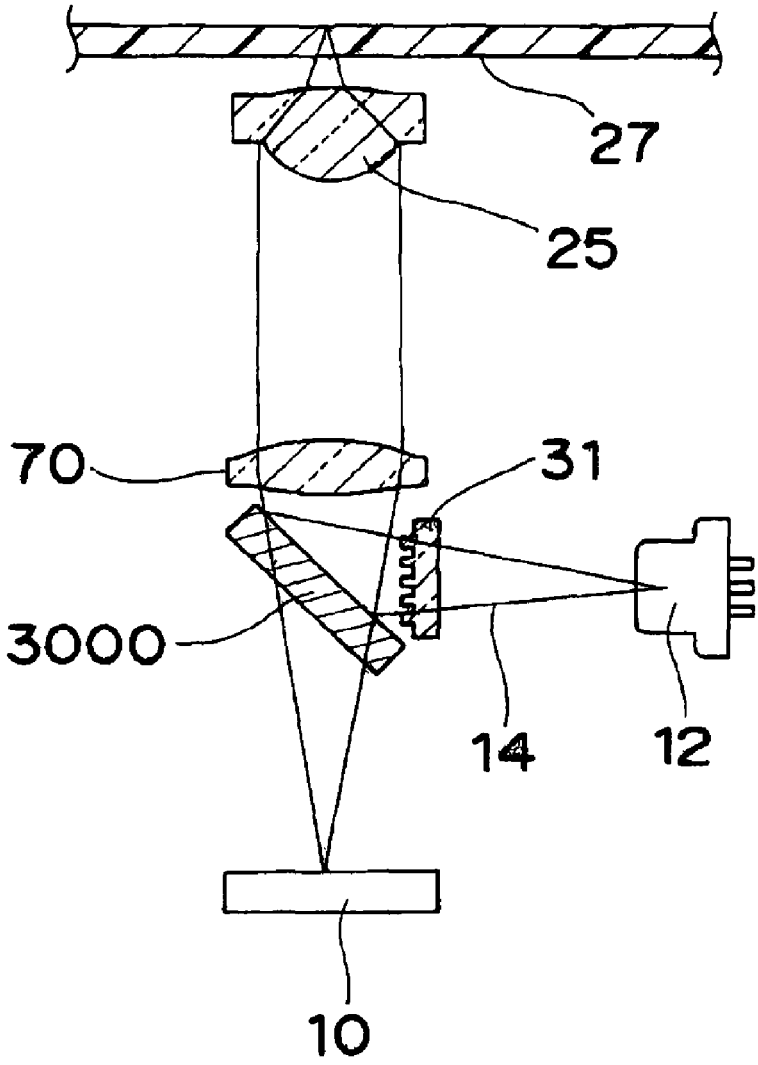
FIG. 1 is a view showing, in schematic form, a configuration of an optical head device according to a first embodiment of the present invention.

Before the description of the present invention proceeds, it is to be noted that like parts are designated by like reference numerals throughout the accompanying drawings. The first embodiment in the present invention will now be described in detail with reference to the drawings.

First Embodiment

FIG. 1 is a view showing, in schematic form, a configuration of an optical head device according to a first embodiment of the present invention.

A light beam 14 radiated from a light source (e.g., red light source) 12 is transmitted through a diffractive element 31 that diffracts some light (partial diffraction) and then reflected at a beam splitter 3000, and has parallelism converted (e.g., to substantially parallel light) by the collimator lens 70, whereby the light beam 14 is converged on the recording surface of the optical disc 27 such as DVD-R and DVD-RAM etc, through a transparent base material of about 0.6 mm by the objective lens 25 to form a sub-spot on the optical disc 27. The light beam reflected by the recording surface of the optical disc 27 passes the same light path in the opposite direction, transmits through the beam splitter 3000, and is then branched towards a direction different from the light source 12 and at the same time, provided with astigmatism. The light beam is photoelectric converted by a light detector 10, and electrical signals for obtaining information signal, servo signal (focus error signal for focus control and tracking error signal for tracking control) are obtained. If an amplifier circuit is incorporated in the light detector 10, satisfactory information signal having high signal/noise (S/N) ratio is obtained, and furthermore, miniaturization of the optical head device is realized and stability is obtained.

Although not shown, the optical head can be thinned by bending the optical axis in a direction perpendicular to the optical disc such as DVD-R and DVD-RAM by arranging a rising mirror between the collimator lens 70 and the objective lens 25.

Figures 2A, 2B:
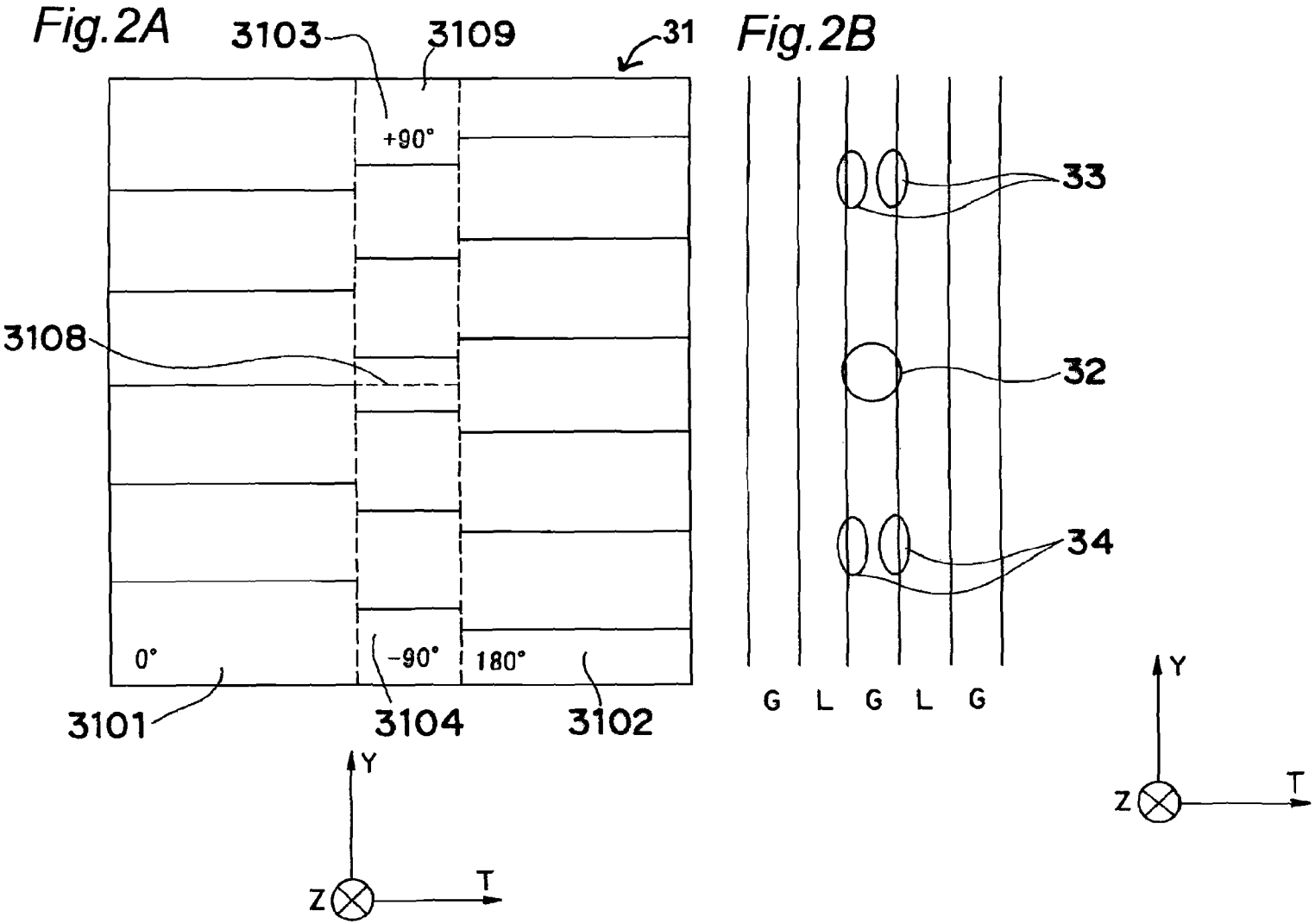
FIG. 2A is a view showing a configuration of a diffractive element mounted on the optical head device of FIG. 1.
FIG. 2B is an explanatory view of a convergence spot on an optical disc when the diffraction grating of FIG. 2A is used.

FIG. 2A is a view showing a configuration of a diffractive element 31 mounted on the optical head device of FIG. 1. In FIG. 2A, the dotted line is a boundary line virtually showing the boundary 3108 of the diffraction grating region. The diffraction grating in each diffraction grating region has the center line of the convex part shown with a solid line. The pitch of the diffraction grating is appropriately designed by the arrangement of the diffractive element 31.

Direction T is the direction perpendicular to the optical axis of the light beam and substantially perpendicular to a projection in a track groove extending direction of the optical disc (not shown), and direction Z is an optical axis direction (direction perpendicular to plane of drawing) of the light beam. T axis is a direction of moving the optical head device when recording or reproducing the inner periphery and the outer periphery of the optical disc, and is a direction in which the objective lens moves according to track following. Y axis is a direction perpendicular to the Z axis and the T axis, and is a direction substantially parallel to the projection in the track groove extending direction of the optical disc. In the above description, projection is performed including mirror inversion etc. along the optical axis of the light beam.

The diffractive element 31 of the present application is divided into regions by a dividing line (dotted line) parallel to the groove direction Y as shown in FIG. 2A, thereby forming diffraction gratings. Assuming the grating phase of the first diffraction grating region 3101 on the left side of the figure is the reference (0 degree), the grating phase of the second diffraction grating region 3102 on the right side of the figure is 180 degrees. The shift in the Y direction of the grating phase is positive. The central region 3109 between the first diffraction grating region 3101 having a phase of 0 degree and the second diffraction grating region 3102 having a phase of 180 degrees is divided into regions by a dividing line 3108 extending in the T direction, whereby a third diffraction grating region 3103 having a phase of 90 degrees and a fourth diffraction grating region 3104 having a phase of −90 degrees are arranged in the Y direction. In other words, the region 3109 between the first diffraction grating region 3101 and the second diffraction grating region 3102 is further divided into plurals, and the phases of the gratings of the divided regions 3103, 3104 take values of opposite signs such as +90 degrees and −90 degrees. The grating phase is in the range from −180 degrees to +180 degrees in the present embodiment. Since the phase has a periodicity in which one period is 360 degrees, the phase can be indicated in other ranges by adding or subtracting integral multiples of 360 degrees. For instance, when the grating phase is indicated in the range from 0 degree to 360 degrees, 360 degrees is added only when the phase is negative, whereby the grating phase of the divided region 3104 of the present embodiment becomes the same as being indicated as 270 degrees. The grating phase is indicated in the range from −180 degrees to +180 degrees in the present application described below. The signal amplitude in a state the objective lens is not moved by the track following is reduced in advance, and the lowering in the amplitude of the tracking error signal in a state the objective lens is moved is relatively avoided by arranging regions 3103, 3104 forming diffraction gratings different from the diffraction gratings of the first diffraction grating region 3101 and the second diffraction grating region 3102 in the central region 3109 sandwiched by the first diffraction grating region 3101 and the second diffraction grating region 3102. The phase is prevented from changing in step form across the entire surface of the diffractive element 31 and light amount distribution in which the sub-beams 33, 34 are line symmetric in the T direction with respect to the symmetric line in the Y direction is obtained by forming regions obtained by dividing the central region 3109 sandwiched between the first diffraction grating region 3101 and the second diffraction grating region 3102 into plurals and arranging diffraction gratings of different phases from each other. Specifically, as shown in a simplified manner in FIG. 2B, each sub-beam appears to be divided into two beams since level lines of the light amount are shown. That is, according to the configuration of the present invention, the effect of satisfying both obtaining the tracking error signal by the optimum DPP method with respect the optical disc 27 of different track pitches using the signal diffractive element 31 and suppressing lowering amount in the amplitude of the tracking error signal in a state the objective lens is moved by the track following is obtained.

The feature of the invention disclosed in the present example lies in dividing the grating region to at least first to fourth regions, where at least the third region and the fourth region are arranged between the first region and the second region, the phase of +90 degrees and −90 degrees being respectively given to the third region and the fourth region assuming the grating phase of the first region is the reference (0 degrees) and the phase of the second region is 180 degrees. In other words, the gratings of four types of phases having phases differing by 90 degrees are formed in the first region to the fourth region. The above described effect is obtained by such feature.

The grating pattern that is linear and of even period and is in the same direction is illustrated. This means that the direction and the size of the grating vector are equal. However, the present application is not limited to the example of an even grating vector. The grating, which is the base in changing the phase, may be curved, the grating period may be partially changed, or the direction of grating may be partially changed to change the wave front of the sub-beam to the desired wave front. Thus, effect of reducing off-axis aberrations of the objective lens is obtained. The off-axis aberration is the aberration that is generated when the beam enters the lens diagonally.

The width in the T direction of the central region 3109 sandwiched by the first diffraction grating region 3101 and the second diffraction grating region 3102 is suitably 10% to 40% of the diameter of the projection (hereinafter referred to as effective diameter) on the plane of the diffraction grating 31 for the main beam of limited opening arranged near the objective lens with respect to the red light. Unless otherwise stated, this is the same for the following embodiments.

The signal variation in time of lens shift thus can be suppressed while ensuring the signal intensity obtained from the sub-beam by defining the width in the T direction.

In the above embodiment, the central region 3109 sandwiched between the diffraction grating region 1 and the diffraction grating region 2 is divided into plurals to provide two regions of the third diffraction grating region 3103 and the fourth diffraction grating region 3104 using the dividing line 3108 extending in the T direction, but may be divided by the dividing line extending in the Y direction instead of the T direction to arrange the plurality of regions in the T direction. The region may be divided at an intermediate angle of the Y direction and the T direction. In this case as well, the phase is alleviated from changing in a step form across the entire surface of the diffraction grating 31, and the sub-beams 33, 34 approach a light amount distribution line symmetric in the T direction with respect to the symmetric line in the Y direction. This is the same for the following embodiments.

Second Embodiment

Figure 3:
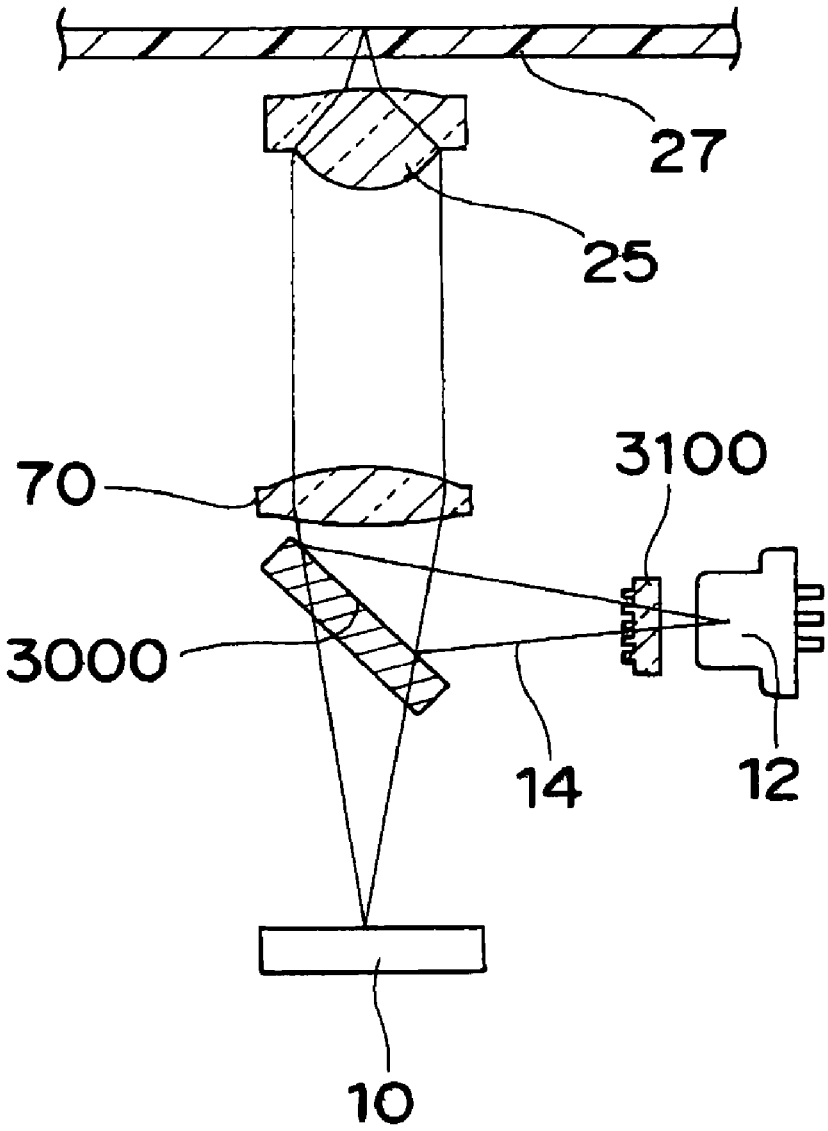
FIG. 3 is a view showing, in schematic form, the configuration of an optical head device according to a second embodiment of the present invention.

Due to restrictions on outer shape of the optical head device, the diffractive element for sub-beam generation used in place of the diffractive element 31 of FIG. 1 must be arranged close to a light source 12 and spaced apart from the collimator lens 70 as in 3100 of FIG. 3. According to such arrangement, the required effective diameter of the diffractive element 3100 reduces and the outer shape miniaturizes, and thus the material cost of the diffractive element 3100 lowers.

Figure 4B:
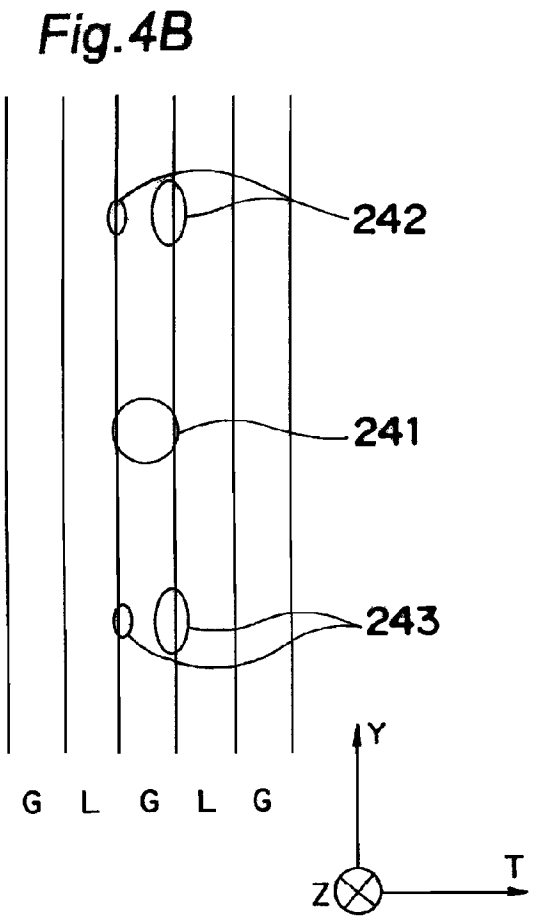
FIG. 4B is an explanatory view of a convergence spot on the optical disc when diffraction grating of FIG. 4A is used on the optical head device of FIG. 3.
Figure 4A:
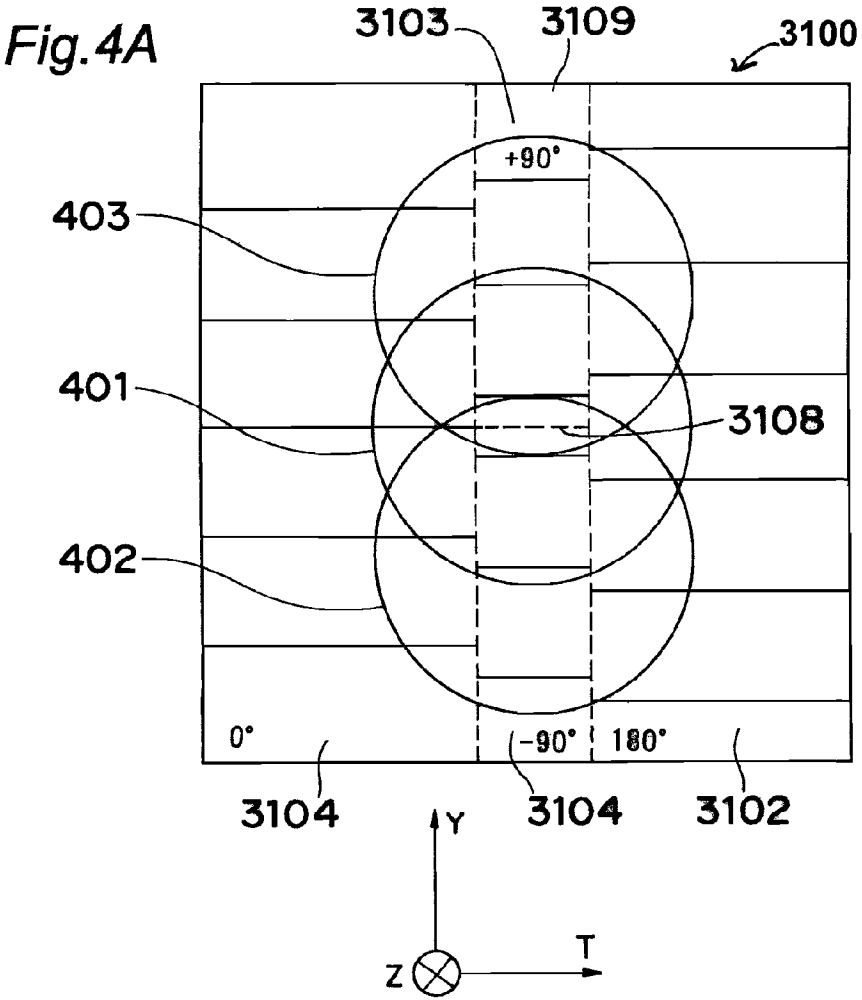
FIG. 4A is a view showing a transmitting region of the main beam and the sub-beam when diffraction grating shown in FIG. 2A is mounted on the optical head device of FIG. 3.
Figure 23B:
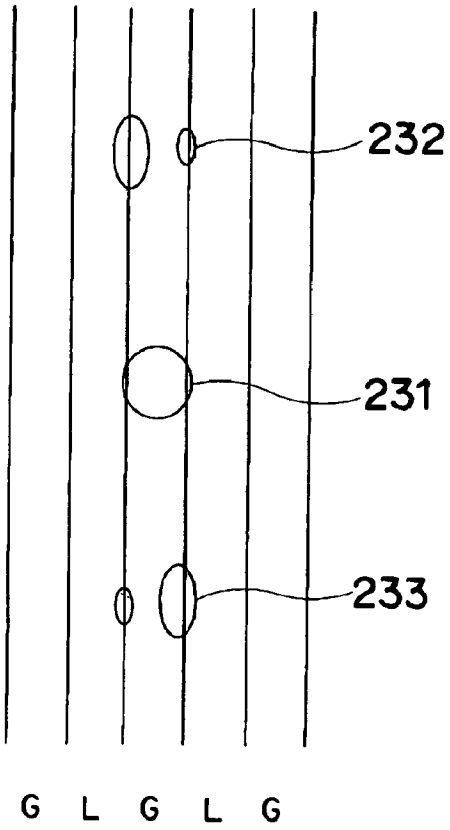
FIG. 23B is an explanatory view of a convergence spot on the optical disc of when the diffraction grating shown in FIG. 23A is used.
Figure 23A:
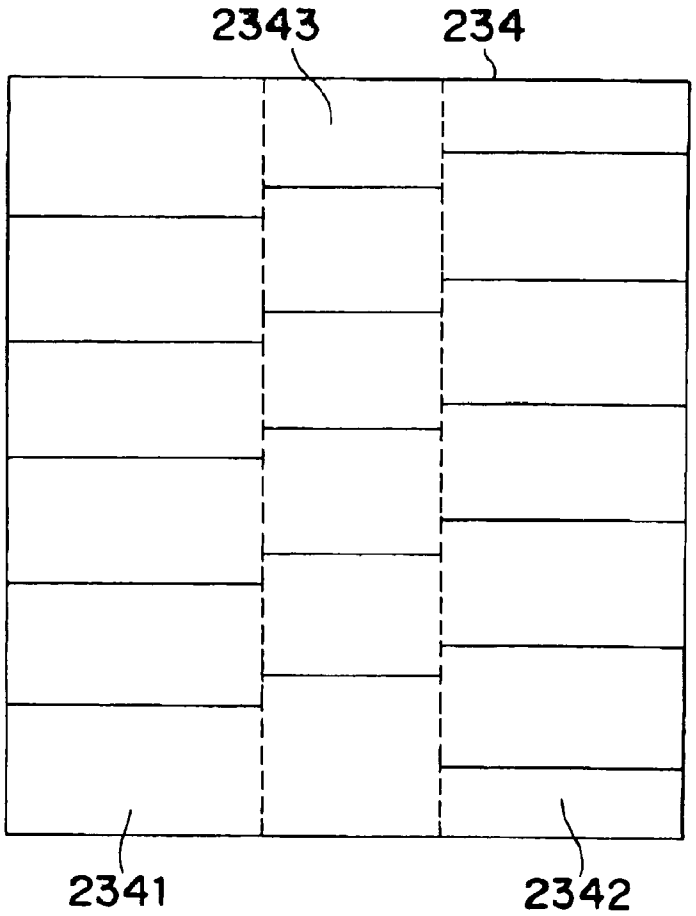
FIG. 23A is a front view showing a configuration of a diffractive element of the conventional optical head device.
Figure 24B:
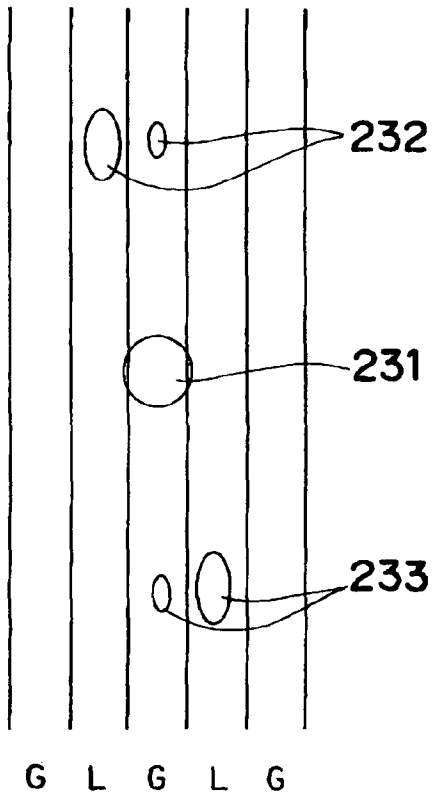
FIG. 24B is an explanatory view of a convergence spot on the optical disc of when the diffraction grating shown in FIG. 24A is used.
Figure 24A:
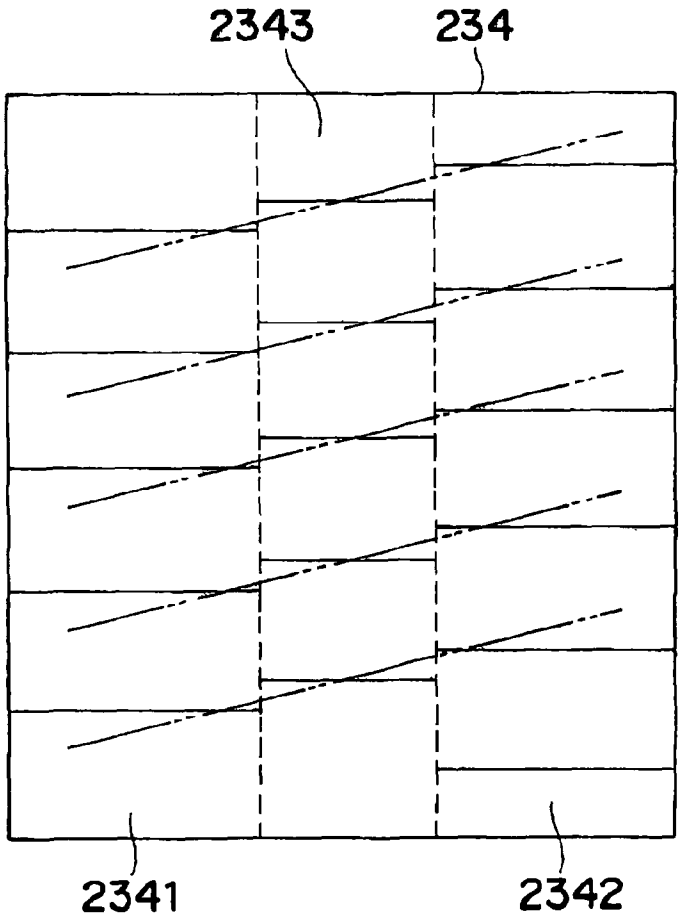
FIG. 24A is a view showing a state of change in diffraction phase that becomes the main component of the diffractive element of the optical head device shown in FIG. 23A.

In this case, however, the region from where the sub-beam is generated in the diffractive element 3100 differs from the region from where the main beam is generated, and the generating region 402 of the sub-beam 242 and the generating region 403 of the sub-beam 243 are shifted in the Y direction with respect to the transmitting region 401 of the main beam 214 as shown in FIG. 4A. This is because the sub-beam is a diffracted light, and the optical axis is tilted with respect to the main beam, whereby the projecting position in the sub-beam of limited opening arranged near the objective lens is shifted from the projecting position of the objective lens in the main beam. The generating regions are shifted because the sub-beam, which is the diffracted light, bends towards the direction different from the main beam. Therefore, the amount of shift of the generating region defined by the product of the angle and the distance becomes larger the larger distance to the limited opening arranged near the objective lens from the diffractive element, that is, the closer the diffractive element is to the light source. Since the beam diameter of the light or the mapping of limited opening is small the closer the diffractive element is to the light source, the proportion of the shift with respect to the beam diameter becomes larger. Focusing on the generating region 403 of the sub-beam 243, the sub-beam 243 in the region between the first diffraction grating region 3101 having a phase of 0 degree and the second diffraction grating region 3102 having a phase of 180 degrees is mainly generated by the third diffraction grating region 3103 having a phase of 90 degrees. Thus, the sub-beam 243 has the phase of the diffraction grating of 0 degree, substantially 90 degrees, and 180 degrees from the left, and the phase changes in step form. Thus, a state close to the prior art example shown in FIGS. 23A, 23B locally occurs.

Focusing on the generating region 402 of the sub-beam 242, the sub-beam 242 in a region between the first diffraction grating region 3101 having a phase of 0 degrees and a second diffraction grating region 3102 having a phase of 180 degrees is mainly generated by the fourth diffraction grating region 3104 having a phase of −90 degrees. In addition, the phase of the second diffraction grating region 3102 is −180 degrees in view of the periodicity of 360 degrees. Thus, the sub-beam 242 has the phase of the diffractive element of 0 degrees, substantially −90 degrees, and −180 degrees from the left, and the phase changes in step form. Thus, a state close to the prior art example shown in FIGS. 23A, 23B locally occurs.

Since the phases of the diffraction gratings of the sub-beam generating regions is in step form, the sub-beam are asymmetric as shown in FIG. 4B, and offset occurs in the tracking error signal by the push-pull method in the main beam and the sub-beam, which offset amount fluctuates depending on the track pitch of the optical disc and cannot be corrected with a constant correction value.

Figure 5B:
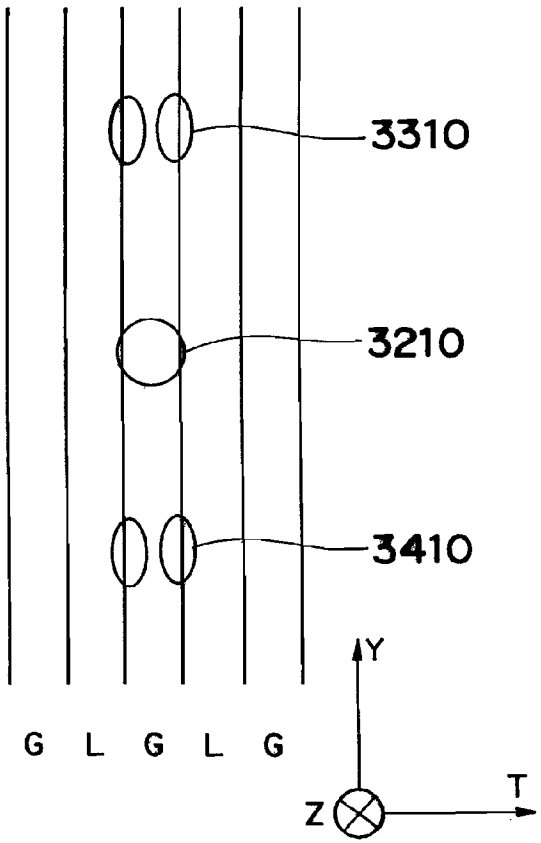
FIG. 5B is an explanatory view of a convergence spot on the optical disc when diffraction grating of FIG. 5A is used.
Figure 5A:
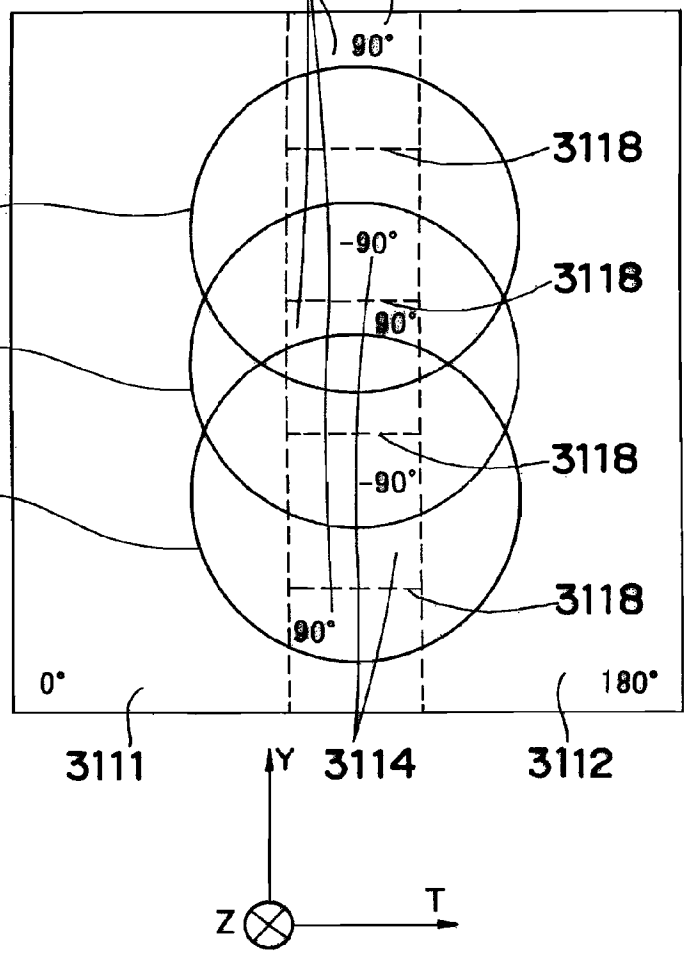
FIG. 5A is a view showing a configuration of a diffractive element mounted on the optical head device of FIG. 3.
Figure 6B:
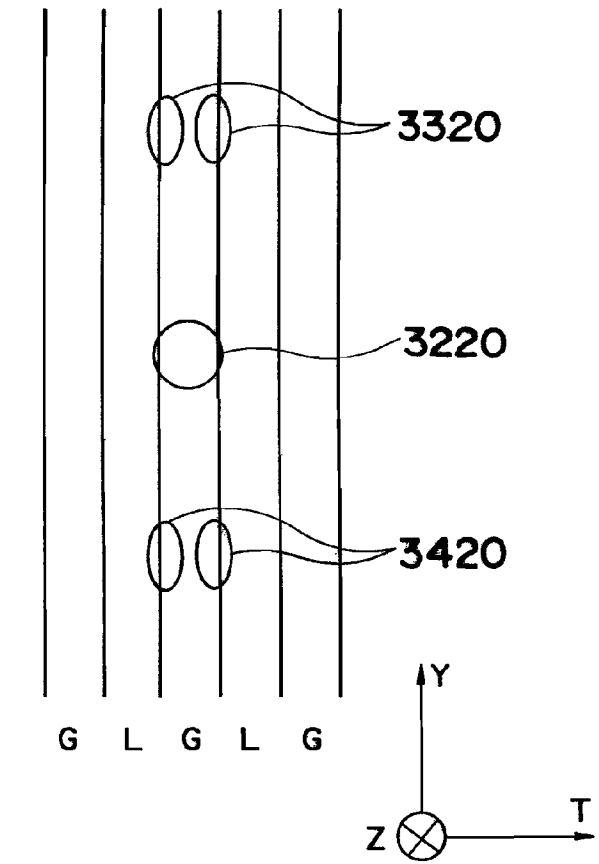
FIG. 6B is an explanatory view of a convergence spot on the optical disc when diffraction grating of FIG. 6A is used.
Figure 6A:
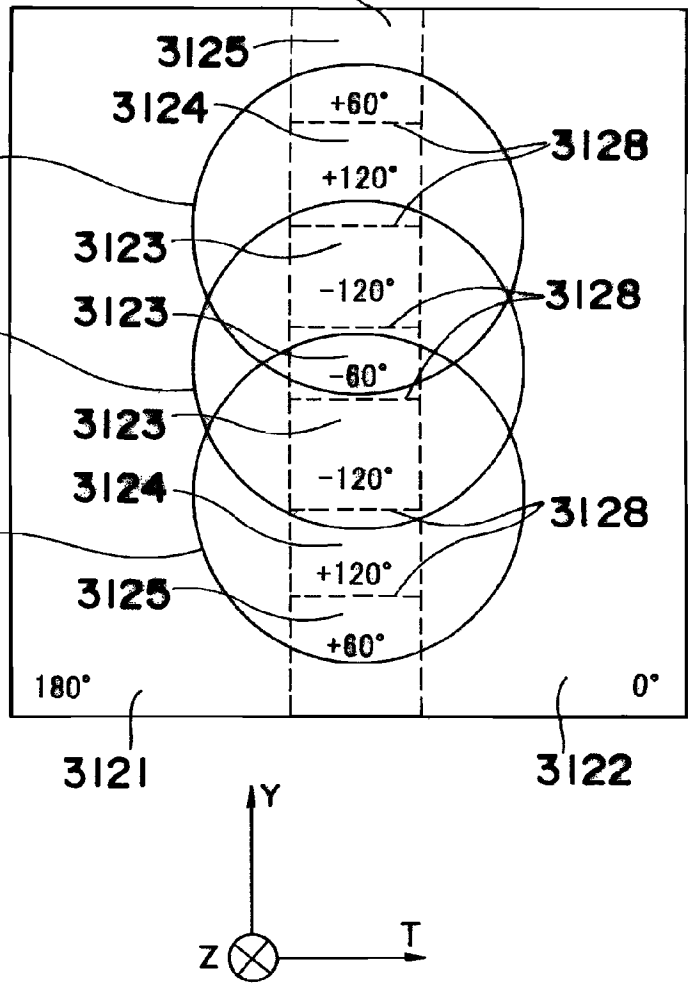
FIG. 6A is a view showing a configuration of a diffraction grating of a third embodiment of the present invention.

In order not to arise such issue, the central region 3119 sandwiched by the first diffraction grating region 3111 and the second diffraction grating region 3112 is divided into a plurality of regions of three or more by two or more virtual boundary lines 3118, to provide diffraction gratings 3113, 3114 having a plurality of types of phases in the present embodiment, as shown in FIGS. 5A and 6A. In FIG. 5A and thereafter, the line of the convex part of the diffraction grating is omitted for simplicity for the grating in a direction same as the pitch. When only the phase of the diffraction grating is shown, the pitch and the direction of the grating in the same region are assumed to be constant.

The diffraction grating 3110 of FIG. 5A divides the central region 3119 between the first diffraction grating region 3111 having a phase of 0 degree (reference) and the second diffraction grating region 3112 having a phase of 180 degrees into five regions by four dividing lines 3118 extending in the T direction, where the three regions are the third diffraction grating region 3113 having a phase of 90 degrees and the remaining two regions are the fourth diffraction grating region 3113B having a phase of −90 degrees.

According to such configuration, the generating region 4310 of the sub beam 3410 and the generating region 4210 of the sub-beam 3310 substantially equally contain the diffraction grating region 3A having a phase of 90 degrees and the diffraction grating region 3B having a phase of −90 degrees, and thus the sub-beam 3310 and the sub-beam 3410 are symmetric as shown in FIG. 5B. Therefore, the effect of satisfying both obtaining the tracking error signal by the optimum DPP method with respect to the optical disc having different track pitches using a single diffractive element, and suppressing the lowering amount in the amplitude of the tracking error signal in a state in which the objective lens is moved by track following is obtained. The number of divided regions by the dividing line 3118 extending in the T direction is not limited to five, and merely needs to be three or more, and thus may be greater than five.

Third Embodiment

The diffraction grating 3120 according to the third embodiment of the present invention is used in place of the diffractive element 31 of FIG. 1. As shown in FIG. 6A, the diffractive element 3120 divides the central region 3129 between the first diffraction grating region 3121 having a phase of 0 degrees and the second diffraction grating region 3122 having a phase of 180 degrees into seven regions by six dividing lines 3128 extending in the T direction to provide the third diffraction grating regions 3123 having a phase of 60 degrees, the fourth diffraction grating regions 3124 having a phase of 120 degrees, a fifth diffraction grating regions 3125 having a phase of −120 degrees, and a sixth diffraction grating region 3126 having a phase of −60 degrees. According to the present configuration, the generating region 4320 of the sub-beam 3420 and the generating region 4220 of the sub-beam 3320 substantially equally include diffraction grating regions which phases contradict each other, and thus the sub-beam 3320 and the sub-beam 3420 are symmetric as shown in FIG. 6B. Therefore, the effect of satisfying both obtaining the tracking error signal by the optimum DPP method with respect to the optical disc having different track pitches using a single diffractive element and suppressing the lowering amount of the tracking error signal in a state the objective lens is moved by track following is obtained. The number of regions to be divided by the dividing line 3128 extending in the T direction is not limited to seven, and may be of greater number. The phase of the diffraction grating formed in the central region 1329 between the diffraction grating region 1 and the diffraction grating region 2 forms a grating having phases of opposite signs, or the average of the phase of the diffraction grating formed in the central region 3129 merely needs to be substantially 0 degrees, and is not necessarily limited to ±60 degrees, ±90 degrees, ±120 degrees, etc.

Fourth Embodiment

Figure 7B:
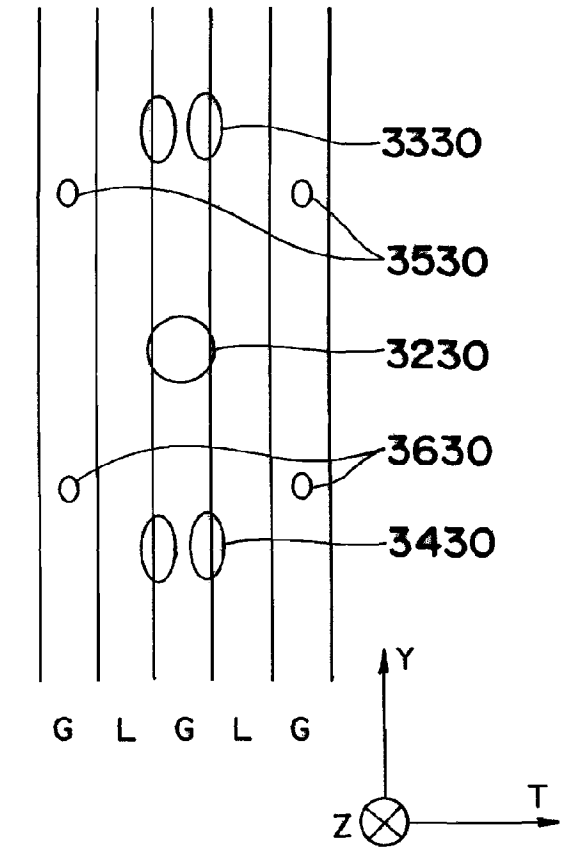
FIG. 7B is an explanatory view of a convergence spot on the optical disc when diffraction grating of FIG. 7A is used.
Figure 7A:
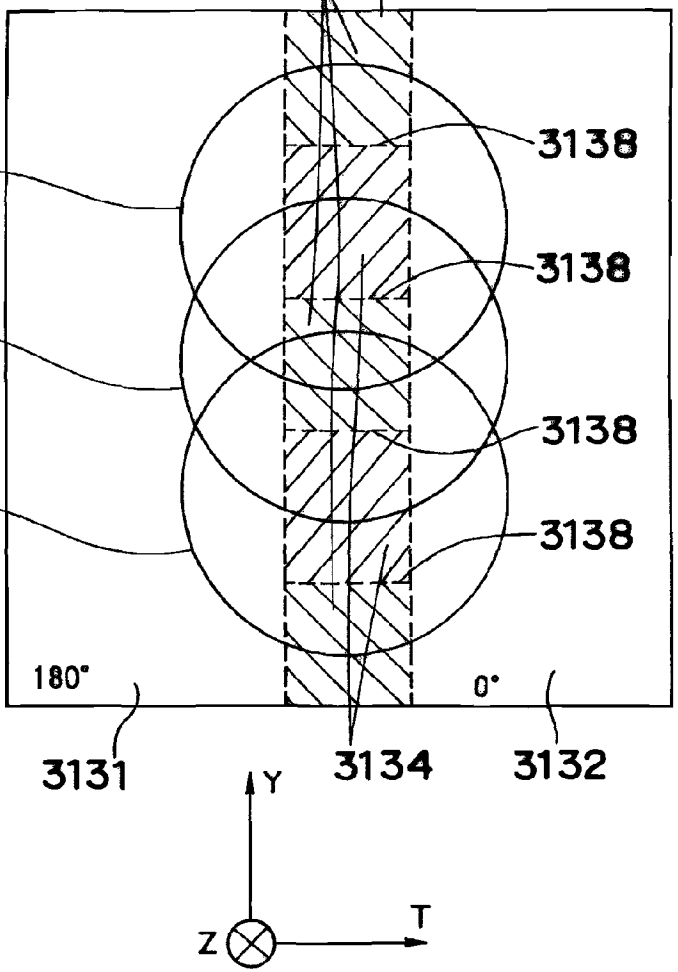
FIG. 7A is a view showing a configuration of a diffraction grating of a fourth embodiment of the present invention.

In another embodiment, an example of a diffractive element arranged with a region forming a diffraction grating of a grating vector different from the diffraction gratings of the diffraction grating region 1 and the diffraction grating region 2 in the central part sandwiched by the first diffraction grating region and the second diffraction grating region will be described. An example of using the diffractive element in place of the diffractive element 31 of FIG. 1 will be described using FIG. 7A. The diffractive element 3130 of FIG. 7A divides the central region 3139 between the first diffraction grating region 3131 having a phase of 0 degrees and the second diffraction grating region 3132 having a phase of 180 degrees into five regions by four dividing lines 3138 extending in the T direction, where three regions are the third diffraction grating region 3133 having a central line of the convex part of diagonally right down in the figure, and the remaining two regions are the fourth diffraction grating region 3134 having a center line of the convex part diagonally left down in the figure. That is, the direction of the grating vector of the first diffraction grating region 3131, the second diffraction grating region 3132, and the central region 3139 is different. In the present configuration, the diffracted light of the central region 3139 sandwiched by the first diffraction grating region 3131 and the second diffraction grating region 3132 is irradiated at positions different from the sub-beams 3330, 3430 as in the diffracted light 3530 and the diffracted light 3630 of FIG. 7B on the recording surface of the optical disc. Similarly, when reflected by the optical disc and irradiated on the light detector, the light is irradiated at positions different from the sub-beams 3330, 3430. Thus, the beam transmitted through the central region 3139 does not contribute to the formation of the push-pull signal, and the amplitude of the signal in a state the objective lens is not moved by track following is reduced in advance. Therefore, the lowering in amplitude of the tracking error signal in a state the objective lens is moved is relatively avoided. The sub-beam 3330 and the sub-beam 3430 are symmetric as shown in FIG. 7B, and thus the effect of satisfying both obtaining the tracking error signal by the optimum DPP method with respect to the optical disc having different track pitches using a single diffractive element and suppressing the lowering amount in the amplitude of the tracking error signal in a state the objective lens is moved by track following is obtained. The number of regions to be divided by the dividing line extending in the T direction is not limited to five, and may be of greater number.

Fifth Embodiment

Figures 8A, 8B:
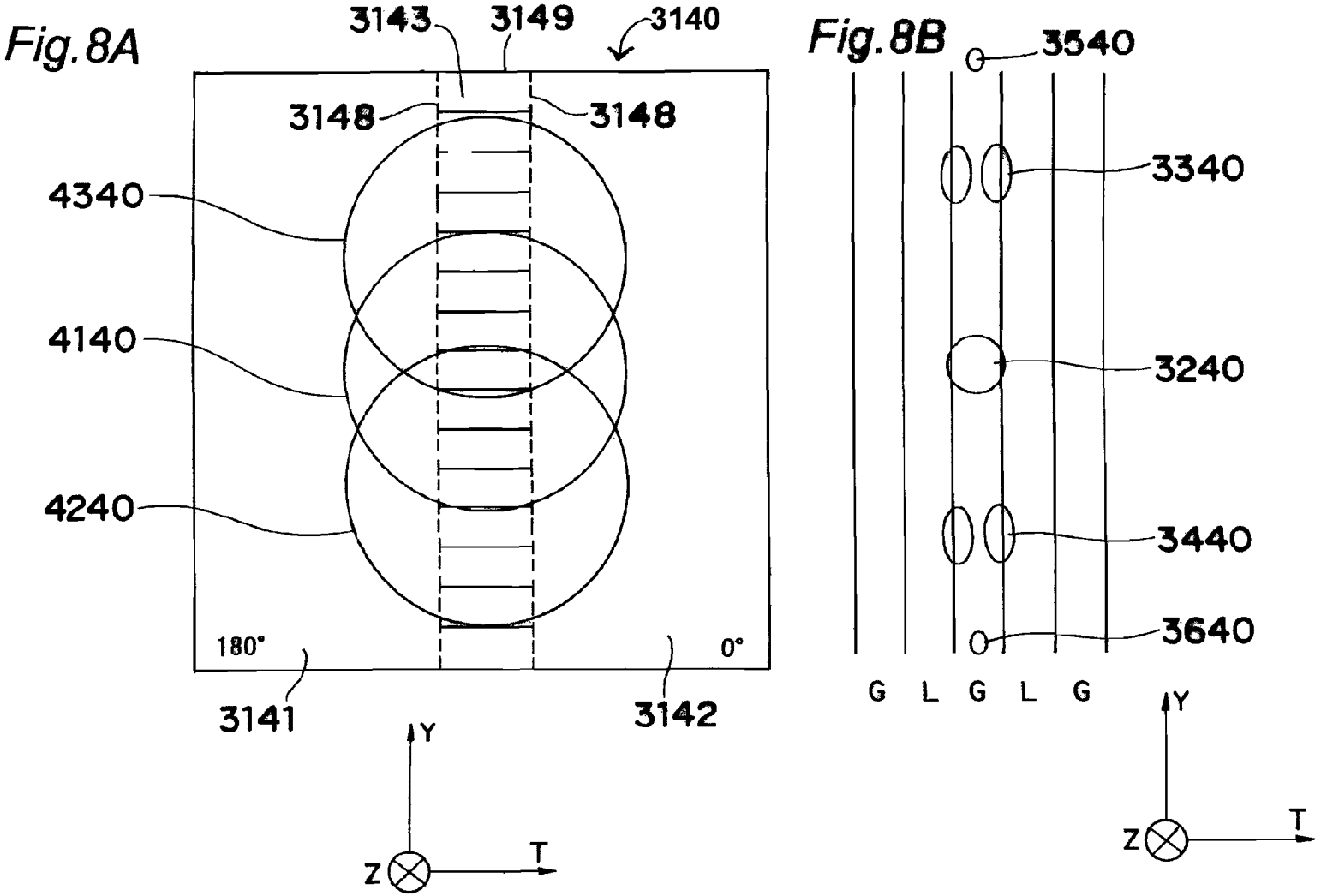
FIG. 8A is a view showing a configuration of a diffraction grating of a fifth embodiment of the present invention.
FIG. 8B is an explanatory view of a convergence spot on the optical disc when diffraction grating of FIG. 8A is used.

A diffractive element 3140 of FIG. 8A used in place of the diffractive element 31 of FIG. 1 forms a third diffraction grating region 3143 having a pitch different from the first diffraction grating region 3141 and the second diffraction grating region 3142 in a central region 3149 between the first diffraction grating region 3141 having a phase of 0 degrees and the second diffraction grating region 3142 having a phase of 180 degrees. Even if the direction of the center line of the convex part of the diffraction grating arranged in the third diffraction grating region 3143 is the same as the first diffraction grating region 3141 and the second diffraction grating region 3142, the size of the grating vector differs since the pitch is different. The direction of the center line of the convex part may be changed. In the present configuration, the diffracted light transmitted through the central region 3149 sandwiched by the first diffraction grating region 3141 and the second diffraction grating region 3142 is irradiated at positions different from the sub-beams 3340, 3440 as in the diffracted light 3540 and the diffracted light 3640 of FIG. 8B on the recording surface of the optical disc. Similarly, when reflected by the optical disc and irradiated on the light detector, the light is irradiated at positions different from the sub-beams 3340, 3440. Thus, the beam transmitted through the central region 3149 does not contribute to the formation of the push-pull signal, and the amplitude of the signal in a state the objective lens is not moved by track following is reduced in advance. Therefore, the lowering in amplitude of the tracking error signal in a state the objective lens is moved is relatively avoided. The sub-beam 3340 and the sub-beam 3440 are symmetric as shown in FIG. 8B, and thus the effect of satisfying both obtaining the tracking error signal by the optimum DPP method with respect to the optical disc having different track pitches using a single diffractive element and suppressing the lowering amount in the amplitude of the tracking error signal in a state the objective lens is moved by track following is obtained. In addition, the central region 3149 sandwiched by the first diffraction grating region 3141 and the second diffraction grating region 3142 may be divided into regions by a dividing line (not shown) extending in the T direction to form diffraction gratings of various pitches.

Sixth Embodiment

The tracking error signal detection method by DPP method is sometimes used with the focus error signal detection method by differential astigmatism method. Patent document 5 (International Laid-Open Publication No. WO 2004/097815) discloses differential astigmatism method and improvement in defocus characteristic of the focus error signal by differential astigmatism method. The diffraction grating divides the diffraction grating for generating the sub-beam into four regions, where the phase of the adjacent regions differ by 180 degrees and the opposing regions are set with the same phase. In such diffraction grating, the sub-beam is divided into four, and when the sub-beam is arranged in the same groove as the main beam on the recording surface of the optical disc, the push-pull signal of the sub-beam has a polarity opposite of the main beam, thereby realizing the DPP method. Furthermore, the cross talk of the push-pull signal component into the focus error signal is canceled out by detecting and adding the focus error signal by astigmatism method from both the main beam and the sub-beam.

In the sub-beam generating diffraction grating disclosed in patent documents 3 and 4, only one area is provided for the grating portion having a phase of 0 degrees and the grating portion having a phase of 180 degrees.

Figures 9A, 9B:
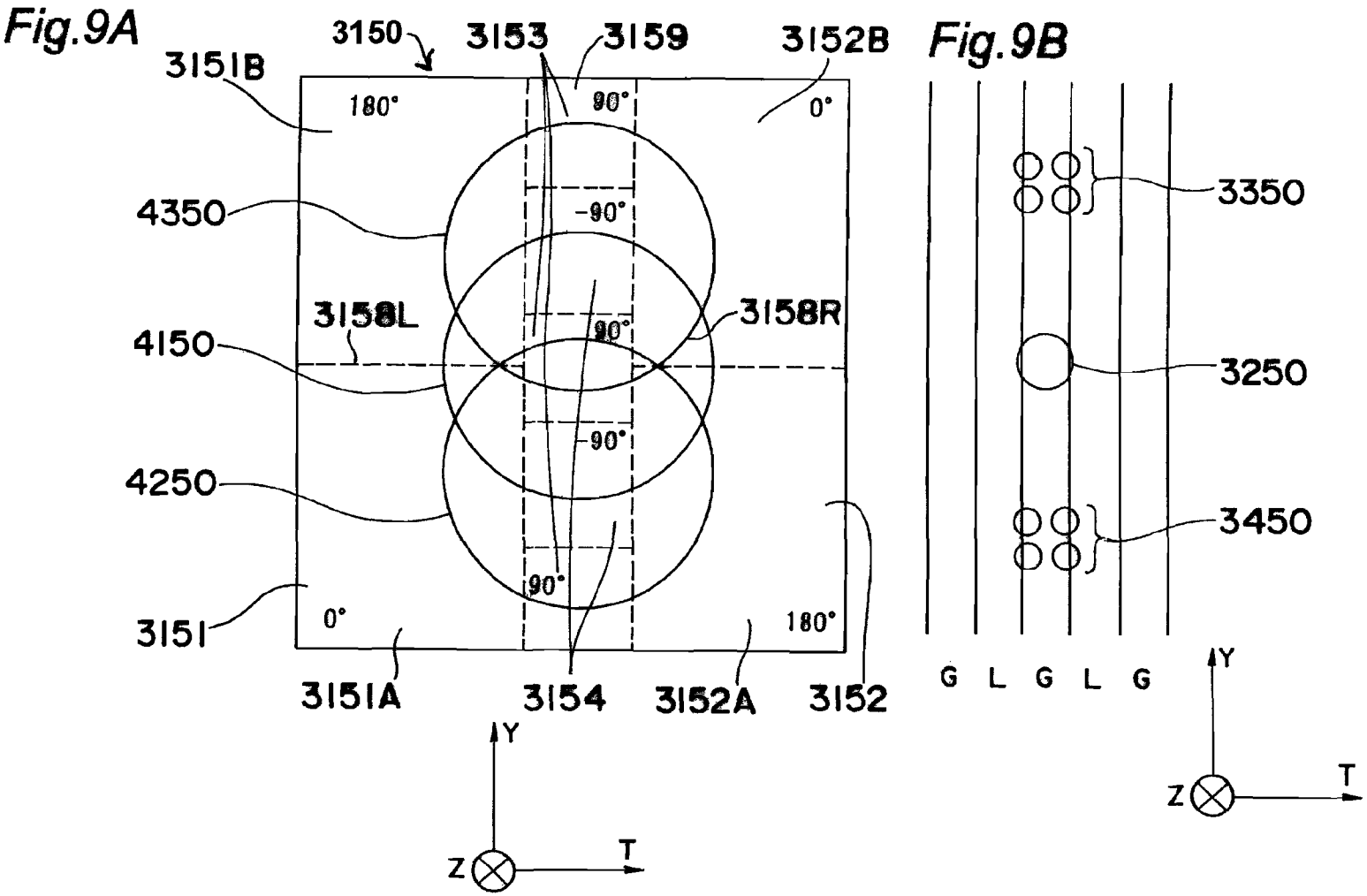
FIG. 9A is a view showing a configuration of a diffraction grating of a sixth embodiment of the present invention.
FIG. 9B is an explanatory view of a convergence spot on the optical disc when diffraction grating of FIG. 9A is used.

As shown in FIG. 9A, in the present embodiment, a left side diffraction region 3151 of the diffractive element 3150 used in place of the diffractive element 31 of FIG. 1 is divided into regions by the boundary 3158L extending in the T direction into an A diffraction grating region 3151A and B diffraction grating region 3151B, where the phase of the diffraction grating of the A diffraction grating region is 0 degrees and the phase of the B diffraction grating region is 180 degrees. Furthermore, the right side diffraction region 3152 of the diffraction grating 3150 is divided into regions by a boundary 3158R extending in the T direction into an A diffraction grating region 3152A and a B diffraction grating region 3152B, where the phase of the diffraction grating of the A diffraction grating region 3152A is 180 degrees and the phase of the B diffraction grating region 3152B is 0 degrees. The A diffraction grating region 3151A of the left side diffraction region 3151 and the A diffraction grating region 3152A of the right side diffraction region 3152 have phases of the diffraction grating differing by 180 degrees with respect to each other, and the B diffraction grating region 3151B of the left side diffraction region 3151 and the B diffraction grating region 3152B of the right side diffraction region 3152 have phases of the diffraction grating differing by 180 degrees with respect to each other, and thus the polarity of the push-pull signals of the main beam and the sub-beam are also opposite. Similar to patent document 5, the defocus characteristic of the focus error signal by differential astigmatism method also improves, and cross talk of the push-pull signal component to the focus error signal is suppressed. The aspect of the present example in that the central region 3159 is arranged between the left side diffraction region 3151 and the right side diffraction region 3152 differs from the patent documents described above. The effect of suppressing lowering amount in the amplitude of the tracking error signal in a state in which the objective lens is moved by track following is obtained by arranging the central region 3159. Specific configuration of the central region 3159 may be of any one of the above embodiments.

(Light Detector)

Figure 10:
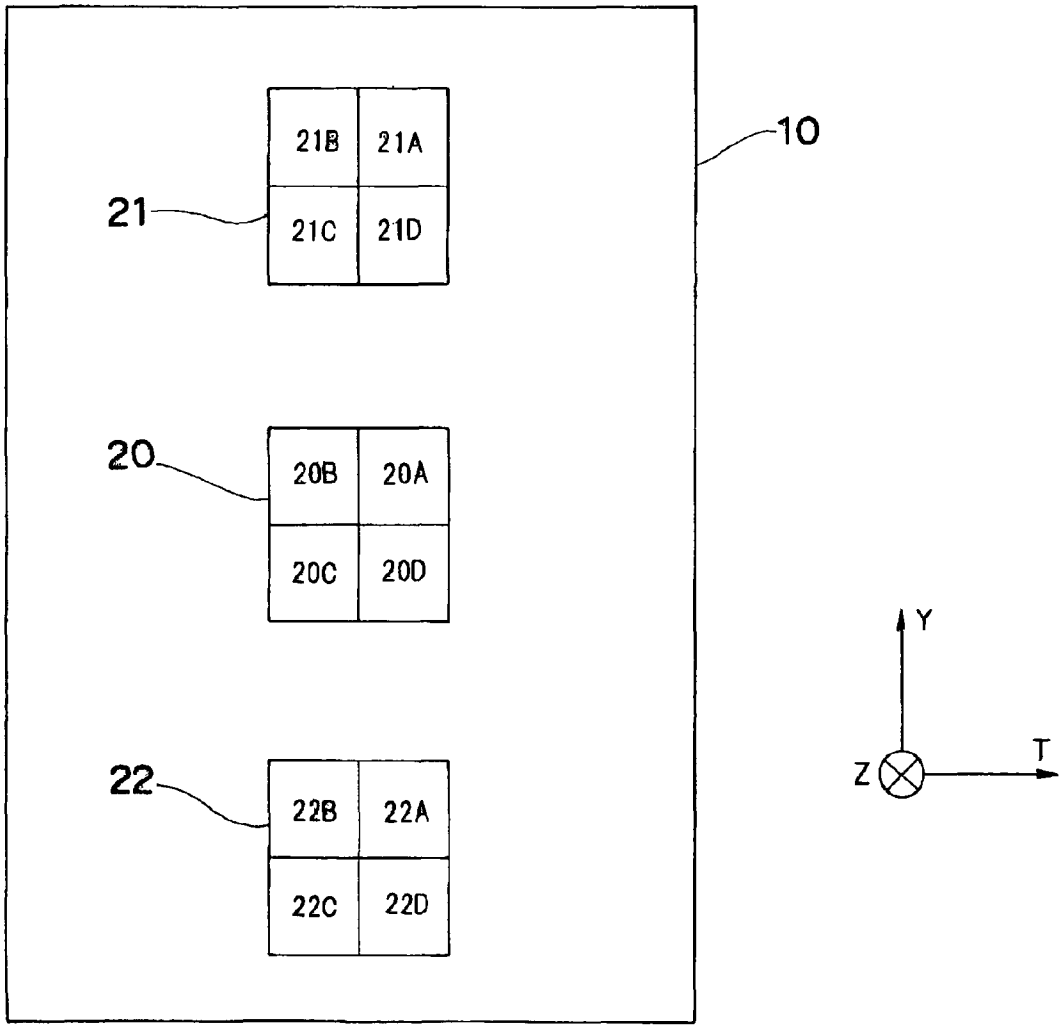
FIG. 10 is a view showing, in schematic form, a configuration example of a light detector used in combination with a sub-beam generating diffractive element in the optical head device of each embodiment of the present invention.

The light detector used in combination with the sub-beam generating diffractive element according to the embodiment of the present invention will now be described. FIG. 10 shows an example of a light detection region dividing configuration of the light detector 10 suited for detecting the focus error signal by differential astigmatism method and detecting the tracking error signal by the DPP method. In FIG. 10, Y, T, Z axes are common as shown in FIG. 1. A pattern of the light detector 10 when seen through from the side opposite to the surface to which the light beam enters is shown. The light receiving region 20 for receiving the main beam is also divided into four, and the focus error signal (FE) is detected using astigmatism provided when transmitting through the beam splitter 3000. Expressing the name of each divided region as signal output intensity, the FE can be calculated by equation 1.

$$FE=(20A+20C)-(20B+20D) \quad \text{(Eq. 1)}$$

The tracking error signal by a so-called phase difference method or push-pull method can also be obtained. The tracking signal by the phase difference method is obtained by comparing the phase of the change in temporal signal intensity of 20A+20C and 20B+20D. The tracking error signal by the push-pull method of the main beam (TEPP) is calculated by equation 2.

$$TEPP=(20A+20B)-(20C+20D) \quad \text{(Eq. 2)}$$

The light receiving regions 21, 22 receive the sub-beam. The tracking error signal by the differential push-pull method may be detected through calculation with the push-pull signal of the light receiving region 20, the focus error signal by the astigmatism method may be detected from the light receiving regions 21, 22 and calculated with the focus error signal obtained from the light receiving region 20 to remove the cross talk from the track signal.

The tracking error signal TEDPP by the differential push-pull method is calculated by equation 3.

$$TEDPP=(20A+20B)-(20C+20D)-K1[(21A+21B)-(21C+21D)]-k1[(22A+22B)-(22C+22D)] \quad \text{(Eq. 3)}$$

where K1 is a constant. The tracking error signal by the push-pull method is prevented from fluctuating when the objective lens moves in the T direction by track following by appropriately defining the constant K1. The cause of fluctuation in the tracking error signal when the objective lens moves in the T direction is the movement of the light beam on the light detector 10 as the far field pattern moves. Since the main beam and the sub-beams are equally subjected to the influence of the movement of the far field pattern, K1 is set so as to cancel the ratio of the light amount of the main beam and the light amount of the sub-beam. Specifically, the optical disc without grooves is prepared, focus control is performed, and the objective lens is forcibly moved in the T direction to define the value of K1 so that the change of TEDPP becomes sufficiently small. The value of K1 must be changed for every track pitch of the optical disc in patent document 3, but preferably, the value of K1 is rather defined according to the light amount distribution of the far field pattern of the light beam and the diffraction efficiency of the diffractive element for sub-beam diffraction. Therefore, K1 is desirably a constant unique to the device such as mounting a half-fixed resistor on the optical head device or the circuit substrate of the optical information apparatus, and shipping after adjusting the amplifier gain.

The focus error signal FED by the differential astigmatism method is calculated by equation 4.

$$FED=(20A+20C)-(20B+20D)-K2[(21A+21C)-(21B+21D)]-K2[(22A+22C)-(22B+22D)] \quad \text{(Eq. 4)}$$

where K2 is a constant. The cross talk from the track signal to the focus error signal is removed by appropriately defining the constant K2. In particular, since the push-pull signal of the DVD-RAM is large, K2 is desirably set so that the cross talk from the track signal to the focus error signal becomes a minimum with respect to the DVD-RAM disc. The focus control is performed on the DVD-RAM disc, and the objective lens is forcibly moved in the T direction to define the value of K2 so that the change in the focus error signal FED becomes sufficiently small. Similar to K1, K2 is desirably a constant unique to the device such as mounting a half-fixed resistor on the optical head device or the circuit substrate of the optical information apparatus, and shipping after adjusting the amplifier gain.

In DVD-R, DVD-RW, DVD-ROM, since the push-pull signal is relatively small, a circuit for switching according to the type of optical disc is arranged in the optical information apparatus so that the focus error signal uses FE of equation 1, and uses FED of equation 4 only for the DVD-RAM to switch the signals.

(Other Configuration Examples of Light Detector)

Figure 11:
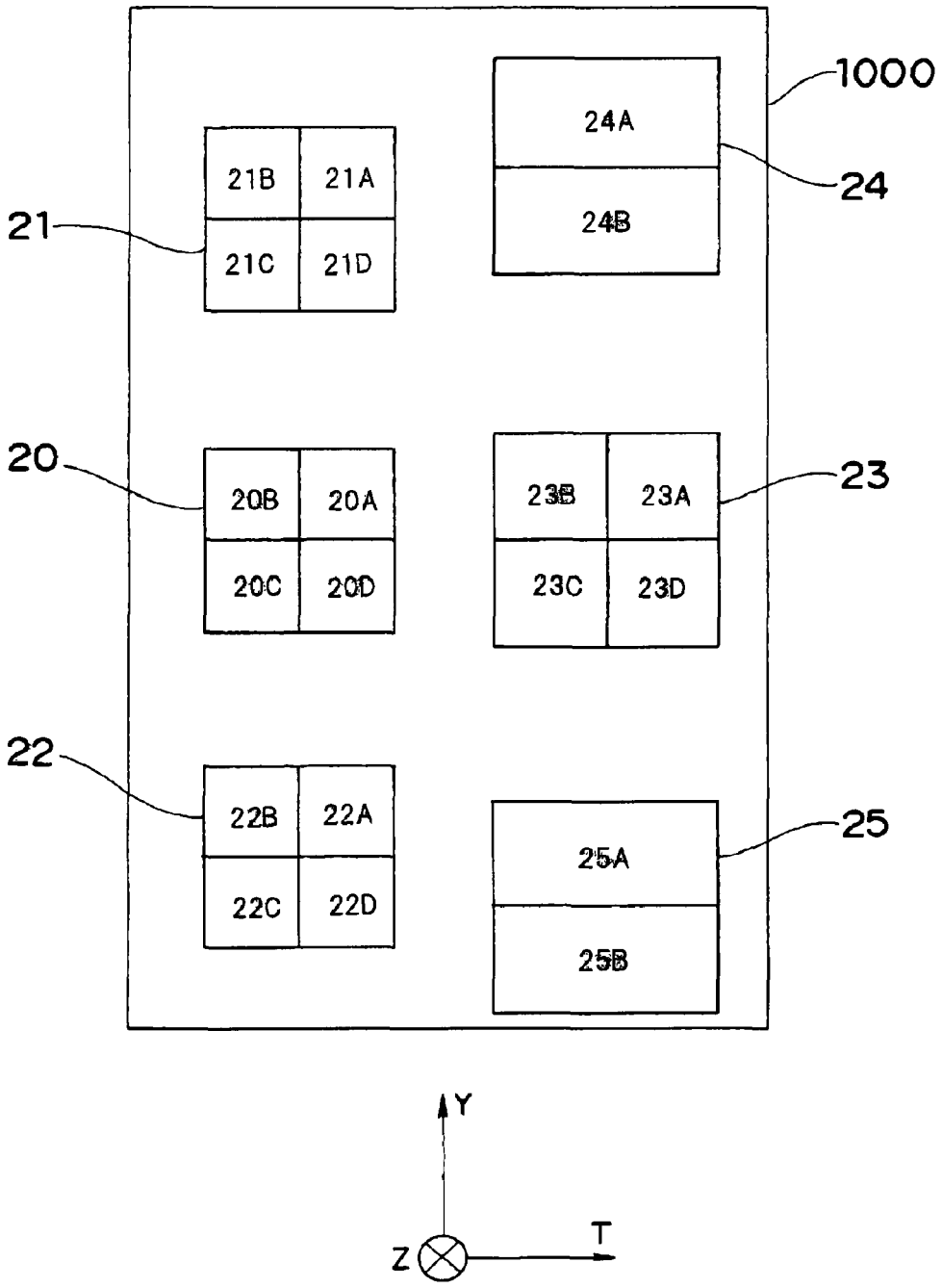
FIG. 11 a view showing, in schematic form, another configuration example of a light detector used in combination with a sub-beam generating diffractive element in the optical head device of each embodiment of the present invention.

A light detector used in combination with a sub-beam generating diffractive element according to the above embodiment of the present invention capable of reproducing or recording not only the DVD but also on the CD will now be described. The light source 12 in FIG. 1 is assumed to be a two-wavelength light source for radiating not only red light but also infrared light. As disclosed in patent document 6 (Japanese Laid-Open Patent Publication No. 7-98431), with the region divided to the inner periphery and the outer periphery, the objective lens 25 converges the light passing through both inner and outer peripheries for the DVD and converges only the light passing through the inner periphery for the CD. Reproduction and recordation of both the CD and the DVD are realized by using the light detector 1000 shown in FIG. 11. In FIG. 11, the light detection regions 20, 21, 22 act the same as the light detector 10 shown in FIG. 10. The light detector 1000 is further arranged with light detection regions 23, 24, 25 for receiving the infrared light. The light detection region 23 is divided into four, and the light detection regions 24, 25 are divided into two. Similar to when the light receiving region 20 receives the red light, the infrared light is received by the light detection region 23, and the focus error signal by the astigmatism method and the tracking error signal by the push-pull method or the phase difference method are detected. When recording on CD-R or CD-RW, the tracking error signal by the DPP method is detected using the output of the light detection regions 24, 25. The tracking error signal TEDPPCD by the DPP method is detected through calculation of equation 5.

$$TEDPPCD=(23A+23B)-(23C+23D)-K3(24A-24B)-K3(25A-22B) \quad \text{(Eq. 5)}$$

where K3 is a constant. The tracking error signal by the push-pull method is prevented from fluctuating when the objective lens moves in the T direction by track following by appropriately defining the constant K3. The cause of fluctuation in the tracking error signal when the objective lens moves in the T direction is the movement of the light beam on the light detector 1000 as the far field pattern moves. Since the main beam and the sub-beam are equally subjected to the influence of the movement of the far field pattern, K3 is set so as to cancel the ratio of the light amount of the main beam and the light amount of the sub-beam. Specifically, the optical disc without grooves is prepared, focus control is performed, and the objective lens is forcibly moved in the T direction to define the value of K3 so that the change of TEDPPCD becomes sufficiently small. The value of K3 is preferably defined according to the light amount distribution of the far field pattern of the light beam and the diffraction efficiency of the diffractive element for sub-beam diffraction. Therefore, K3 is desirably a constant unique to the device such as mounting a half-fixed resistor on the optical head device or the circuit substrate of the optical information apparatus, and shipping after adjusting the amplifier gain. Since the diffractive element described in the previous embodiments is used as the sub-beam generating diffractive element in the present application, a satisfactory DPP signal can be obtained even in CD in which the track pitch greatly differs from the DVD. However, since the effective diameter of the infrared light is about ¾ of the red light, the width of the region between the diffraction grating region 1 and the diffraction grating region 2 of the sub-beam generating diffractive element is desirably less than or equal to 30% of the effective diameter (projection of objective lens) of the red light. As previously described that the width is desirably 10% to 40% in the optical head dedicated for DVD, the width of the region between the diffraction grating region 1 and the diffraction grating region 2 of the sub-beam generating diffractive element is desirably 10% to 30% of the effective diameter (projection of objective lens) of the red light to satisfy both requirements when also reproducing the CD.

(Optical Head Device)

Figure 12:
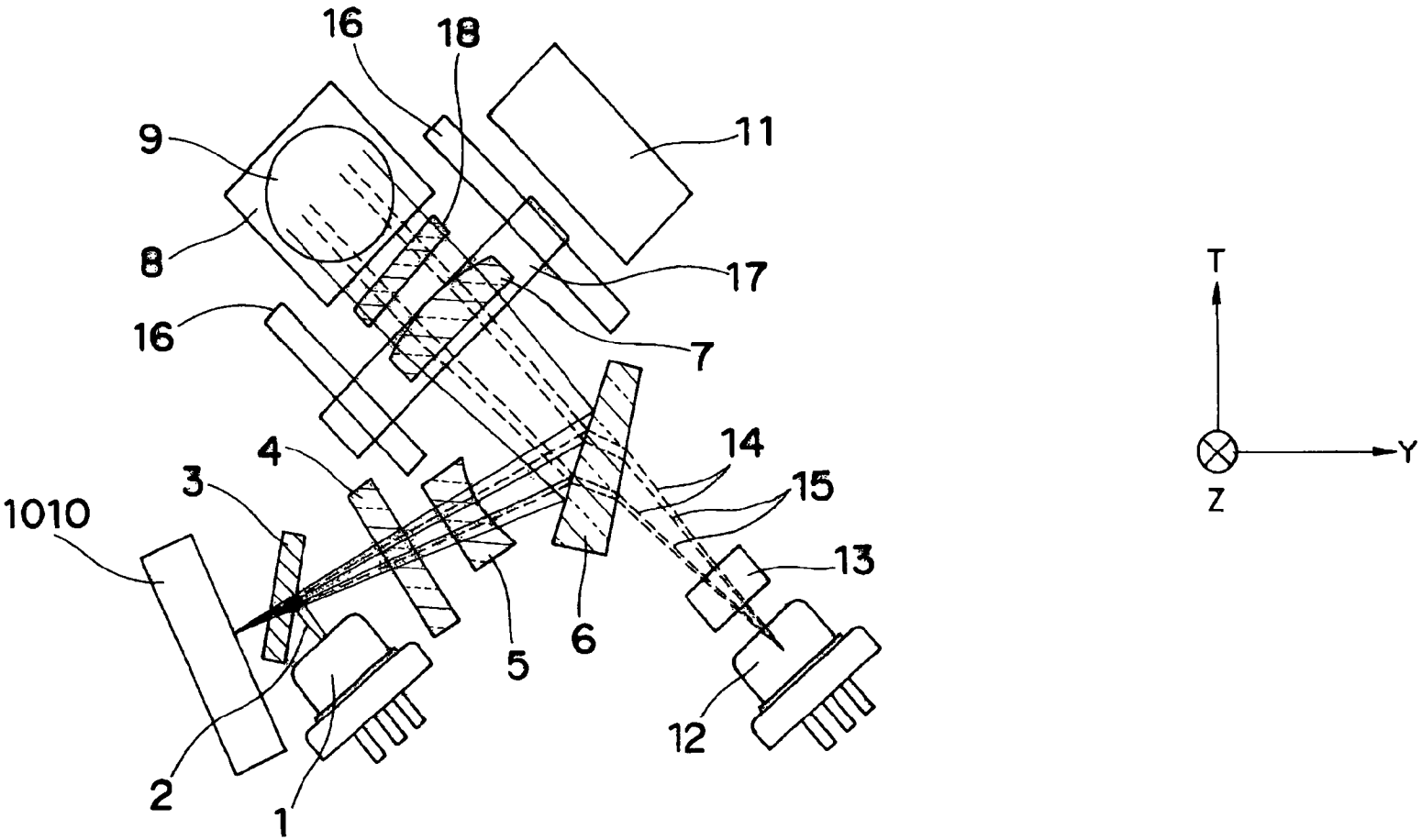
FIG. 12 is a view showing, in schematic form, a configuration of an optical head device according to another embodiment of the present invention.

The optical head device capable of reproducing or recording not only DVD but also CD and BD will now be described. In FIG. 12, the direction T is a direction perpendicular to the optical axis of the objective lens 9 and substantially perpendicular to the track groove extending direction of the optical disc (not shown), and direction Z is an optical axis direction of the objective lens 34, 41, that is, focusing direction (direction perpendicular to plane of drawing). The T-axis is a direction of moving the optical head device when recording and reproducing the inner periphery and the outer periphery of the optical disc. Y-axis is a direction perpendicular to the Z-axis and the T-axis and is a direction substantially parallel to the track groove extending direction of the optical disc at the position of the objective lens 9. The configuration of mirror inversion in which the T-axis and the Y-axis are inverted, or rotated by 90°, 180°, 270° may be adopted.

The light beam 2 of linear polarized light radiated from a first short wavelength light source (e.g., blue light source) 1 is reflected by a polarization separation film at the surface of a parallel flat plate 3, and transmitted through a hologram element 4. A reflective hologram (not shown) is formed at a region that does not shield the incident light to the objective lens 9 distant from the optical axis of the hologram element 4, and a monitor signal for stabilizing the light intensity is obtained without increasing the number of components by receiving the reflected diffracted light at the light detector 10 and monitoring the light intensity of the light beam 2.

The light beam 1 transmitted through the hologram element 4 is converted to light flux that is more greatly diverged by a relay lens 5. The relay lens 5 has a concave lens effect, and converts the angle of estimating the light source 1 from the opening portion of the objective lens 9, that is, the light source side numerical aperture (NA) is converted from small NA in the vicinity of the light source to the large NA on the collimator lens 7 side. The parallelism of the light beam 2 is converted to close to parallel by the collimator lens 7, and the optical axis is bent in the Z axis direction perpendicular to the optical disc by the rising mirror 8. The objective lens 9 passes the light beam 2 through the transparent base material of about 0.1 mm, thinner than 0.6 mm, and converges the light beam 2 on the recording surface of the optical disc of high density such as BD. The collimator lens 7 makes the light beams close to be parallel, that is, alleviates the divergence degree, and may be configured by combined two lenses. When moving the collimator lens 7 in the optical axis direction in order to correct spherical aberration, if the collimator lens 7 is configured by two lenses, only one of the two lenses needs to be moved. A quarter wavelength plate 18 changes linear polarized light to circular polarized light. The light beam reflected at the recording surface of the optical disc follows the original light path in the opposite direction, and is made to the linear polarized light in the direction perpendicular to the direction when exit from the light source 1 by the quarter wavelength plate 18, and transmitted through a branching member such as parallel flat plate 3 having the polarization separation film formed on the surface along with one part of the light beam diffracted by the hologram element 4, branched to a direction different from the light source 1, and photoelectric converted by the light detector 1010, so that electrical signals for obtaining information signal and servo signal (focus error signal for focus control, that is, focus servo and tracking signal for tracking control) are obtained.

The light beam 15 radiated from the second light source (e.g., infrared light source) 12 is transmitted through (partial diffraction) the diffractive element 13 for diffracting some light to form a sub-spot on the optical disc, transmitted through a wedge 6 having a cross sectional shape of a wedge shape, and has the parallelism converted by the collimator lens 7 (e.g., to substantially parallel light) and the optical axis bent by the rising mirror 9 in a direction perpendicular to the optical disc such as compact disc (CD) having lower recording density than the BD. The objective lens 9 passes the light beam 14 through the transparent base material of about 1.2 mm and converges the light beam 14 on the recording surface of the optical disc. The light beam reflected by the recording surface of the optical disc follows the original light path in the opposite direction, is branched towards a direction different from the light source 12 by a branching member such as polarizing selection film arranged on the surface on the collimator lens 7 side of the wedge 6, and photoelectric converted by the light detector 1010 similar to the light beam 1, so that electrical signals for obtaining information signal and servo signal (focus error signal for focus control, tracking signal for tracking control) are obtained. If an amplifier circuit is incorporated in the light detector 10, satisfactory information signal having high signal/noise (S/N) ratio is obtained, and miniaturization and thinning of the optical head device are achieved and stability is obtained.

Furthermore, in order to perform reproduction or recordation of a third optical disc (e.g., DVD) having an intermediate recording density of the two types of optical discs, the third red light source is arranged in the vicinity of the light source 12, and a beam splitter arranged in the vicinity of the light source 12 for combining the light paths with the infrared light source may be arranged, but if the light source 12 is a two-wavelength light source for exiting the light beam of two wavelengths of red light and infrared light, the beam splitter is unnecessary and the number of components is reduced.

The light beam 15 of red light radiated from the light source 12 reaches the objective lens 9, similar to the red light, and passes through the transparent base material of about 0.6 mm and converges on the recording surface of the optical disc such as DVD by the objective lens 9. Similar to the red light, the light beam reflected by the recording surface of the optical disc follows the original light path in the opposite direction, and electrical signals for obtaining information signal and servo signal (focus error signal for focus control, tracking signal for tracking control) are obtained by the light detector 10.

Generally, in order to branch the optical path, a cube type beam splitter in which two triangular transparent members are attached may be used, but the number of components can be reduced if parallel flat plate or wedge is used as in the present application, and the material cost is reduced. If the beam splitter of a single member is arranged in a non-parallel light path from the light source to the objective lens to transmit light, the wedge 6 as shown in FIG. 12 is used to prevent production of astigmatism, and the angle of incidence of the optical axis is desirably smaller than 45 degrees. Aberration may still occur due to manufacturing error even if the above are taken into consideration. Thus, in the example shown in FIG. 1 of the present application, the light beam 2 to be converged on the optical disc having the highest density is reflected without transmitting through either of the two beam splitters in the non-parallel light path from the light source 1 to the collimator lens 7. Thus, satisfactory signal reproduction and signal recordation can be realized on the optical disc having the highest density such as BD.

The objective lens 9 is fixed at a predetermined position of the actuator (not shown) for microscopically moving the objective lens. An object lens drive device (objective lens actuator) is able to microscopically move the objective lens 9 in both focusing direction Z orthogonal to the recording surface of the optical disc and tracking direction Y of the optical disc.

When using the objective lens 9 of NA 0.85 or of larger numerical aperture for reproduction or recordation of BD and the like, spherical aberration is significantly produced with respect to the thickness of the transparent base material filled from the surface to which the light enters the optical disc up to the information recording surface when performing recordation or reproduction on the optical disc since the numerical aperture is large. In the present example, the dispersion convergence degree of the light from the collimator lens 7 to the objective lens 9 is changed by moving the collimator lens 7 in the optical axis direction of the collimator lens 7. When the dispersion convergence degree of the light entering the objective lens changes, the spherical aberration changes, and thus the spherical aberration originating from the base material thickness difference is corrected using the same. The optical head device shown in FIG. 12 is arranged with a driving device 11 to move the collimator lens 7 in the optical axis direction of the collimator lens 7. Specifically, stepping motor, brushless motor, or the like is used as the driving device 11. A holder 17 for holding the collimator lens 7, a guide shaft 16 for guiding the movement of the holder 17, and a gear (not shown) for transmitting the driving force of the driving motor 11 to the holder 17 are arranged in the optical head device. The holder 17 for holding the collimator lens 7 may be integrally molded with the collimator lens 7, whereby number of components of the optical head device is reduced if integrally molded.

The collimator lens 7 is prevented from performing an unintended movement with respect to inertia force by acceleration and deceleration speed when moving the entire optical head device in the inner and outer peripheral direction of the optical disc by having the optical axis of the collimator lens 7 non-parallel to the Y axis as in the present application.

The objective lens 25 converges the infrared light 15 at the inner most peripheral portion near the optical axis through the transparent base material of about 1.2 mm of the low density optical disc 28 such as CD. The objective lens 25 also converges the red light 14 up to the middle peripheral portion of a range one size wider than the inner most peripheral portion through the transparent base material of about 0.6 mm of the optical disc 27 such as DVD. The objective lens 25 converges the blue light 2 within the effective diameter through the transparent base material of about 0.1 mm or thinner of the high density optical disc 26 such as BD.

Therefore, in order to converge the respective light passed through the transparent base material of different thicknesses, diffractive element is effectively used, as disclosed in patent document 6 (Japanese Laid-Open Patent No. 7-98431). The diffractive element has the design of the inner most peripheral part, the middle peripheral part, and the outer most peripheral part to be discontinuous, so that the inner most peripheral part converges through the base material of any thickness, and the outer most peripheral part converges only when transmitted through the base material of 0.1 mm or thinner. As one example, the design is more facilitated by using the light source of different wavelengths as described above. The CD uses infrared light, DVD uses red light, and BD uses blue light, and correction of spherical aberration due to base material thickness and switching in limited opening according to the type of disc are achieved by utilizing the fact that the diffraction angle of a primary diffracted light of the diffractive element differs depending on the wavelength.

Figure 13:
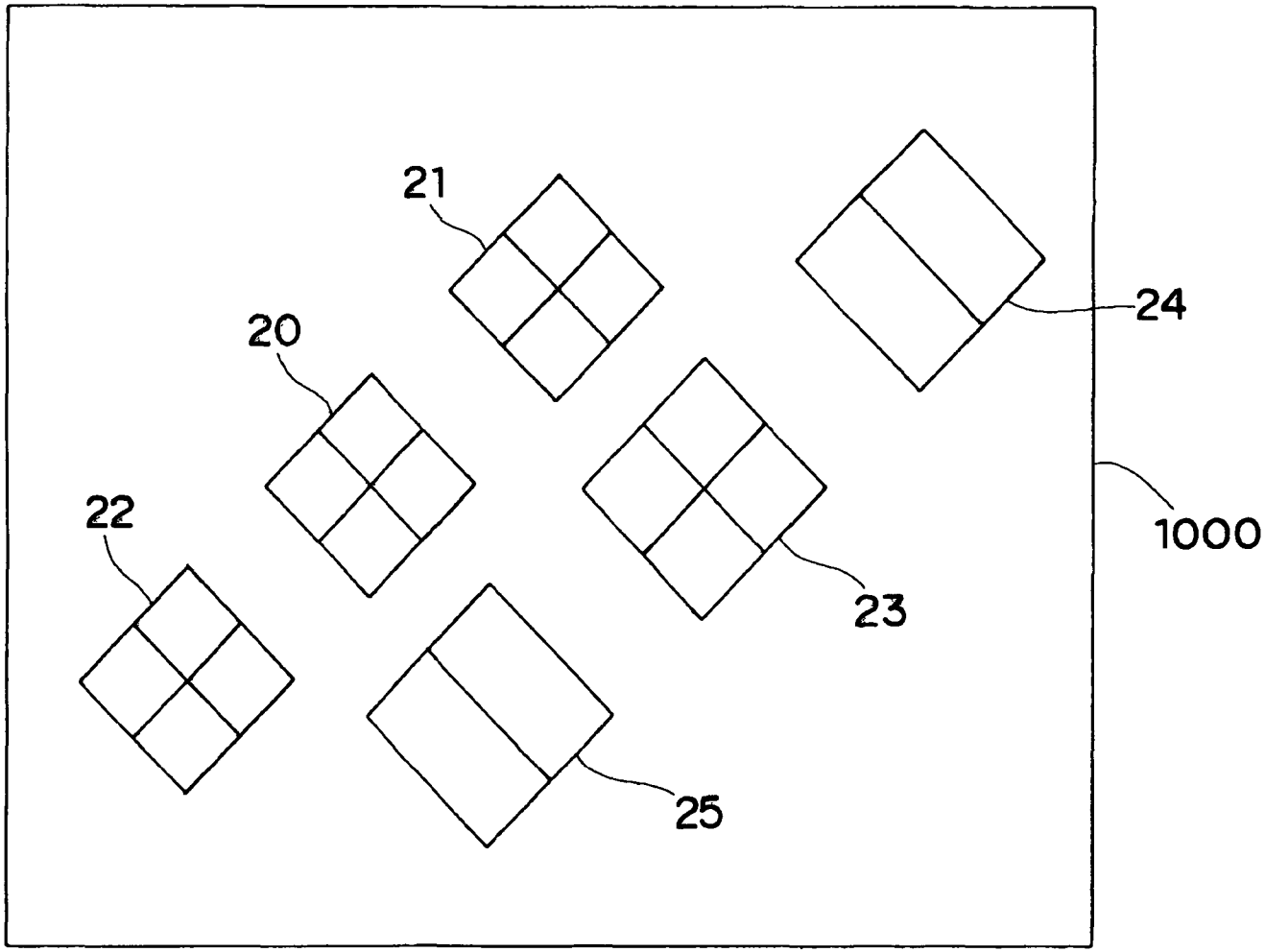
FIG. 13 is a view showing, in schematic form, a configuration of a light detector mounted on the optical head device shown in FIG. 12.

FIG. 13 shows an example of a division of a light detection region of the light detector 1010 suited for detecting the focus error signal by astigmatism method. In FIG. 13, a pattern seen through from the side opposite to the surface to which the light beam enters of the light detector 1010 is shown. The light receiving regions 20, 21, 22, 23, 24, 25 are denoted with the same reference numbers for the portions acting the same as the light detector 1000 of FIG. 11 with respect to the red light and the infrared light. The light receiving region 20 receives the blue light and the red light. The light receiving region 20 is divided into four, and detects the focus error signal using astigmatism provided by the parallel flat plate 3. The tracking signal by the so-called phase difference method and push-pull method may also be obtained. The light receiving regions 21, 22 receive the sub-beam diffracted when the red light passes through the diffractive element 13. The tracking error signal by the differential push-pull method is detected through calculation with the push-pull signal of the light receiving region 20, the focus error signal by the astigmatism method is detected from the light receiving regions 21, 22 and calculated with the focus error signal obtained from the light receiving region 20 to perform the differential astigmatism method of removing cross talk from the track signal. By arranging the diffractive element between the light source 1 and the parallel flat plate 3, the sub-beam signal can be detected from the light receiving regions 21, 22 in the blue light, similar to in the red light.

The light receiving regions 23, 24, 25 receive infrared light. The inter-center distance of the light receiving regions 20 and 23 is set to the distance obtained by multiplying a magnification ratio realized by the relay lens 5 to the inter-light emitting point distance of the red light and the infrared light in the light source 12. Assuming the inter-center distance of the light receiving regions 20 and 21 is L1, and the inter-center distance of the light receiving regions 23, 24 is L2, the ratio of L1 and L2 is set so as to be equal to the ratio of wavelength of red light: wavelength of infrared light. The light receiving region 23 is divided into four, and the focus error signal is detected using astigmatism provided by the parallel flat plate 3. The tracking signal by the so-called phase difference method and the push-pull method may also be obtained. The light receiving regions 24, 25 receive sub-beam diffracted when the infrared light passes through the diffractive element 13. The tracking signal by the differential push-pull method is detected through calculation with the push-pull signal of the light receiving region 23. In the present application, the diffractive element described in the previous embodiments such as diffractive element 31, 3100 is used as the diffractive element 13. Thus, the effect of satisfying both obtaining the tracking error signal by DPP method suited for the optical disc of different track pitches using a single diffractive element, and suppressing the lowering amount in the amplitude of tracking error signal in a state the objective lens is moved by tracking following is obtained.

The number of components of the semiconductor component is reduced by arranging a plurality of light receiving regions on a single light detector or a single semiconductor chip and photoelectric converting the different wavelengths.

(Optical Information Apparatus)

Figure 14:
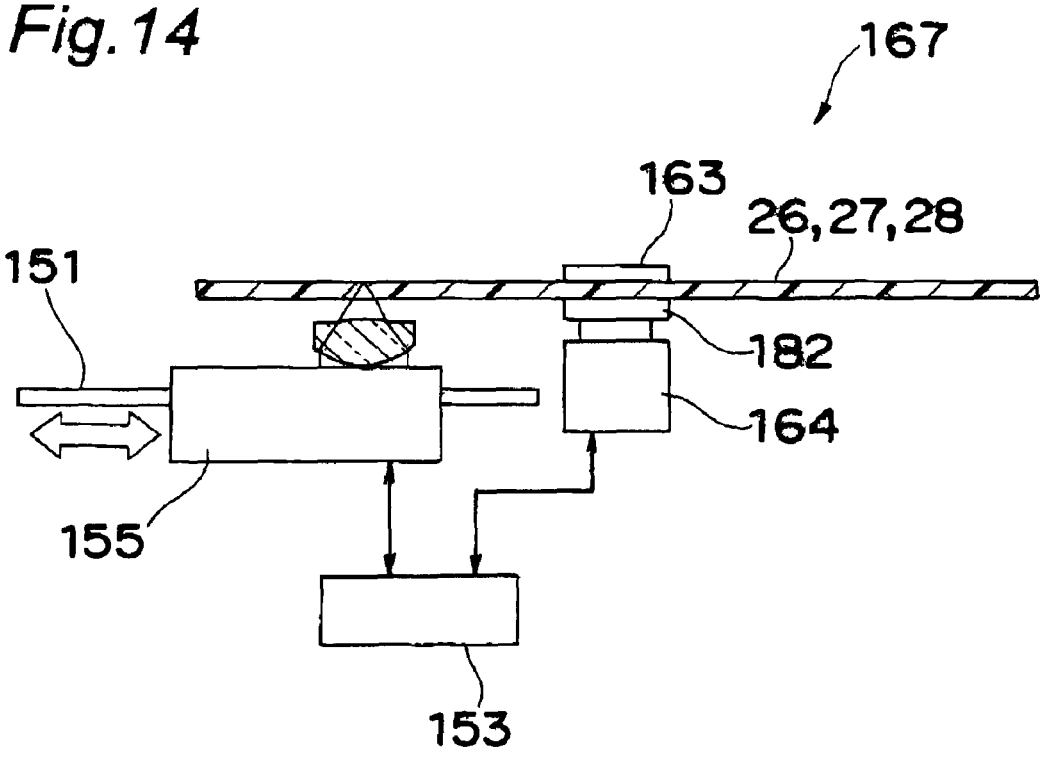
FIG. 14 is a view showing, in schematic form, a configuration of an optical information apparatus mounted with the optical head device of FIG. 12.

Furthermore, a configuration example of the optical information apparatus using the optical head device of the present invention is shown in FIG. 14. In FIG. 14, the optical discs 26, 27, 28 are arranged on a turn table 182, and rotated by a motor 164. The optical head device shown in FIG. 12 is used for the optical head device 155. The optical head device 155 is roughly moved by the drive device 151 of the optical head device up to a track where the desired information is present in the optical disc.

The optical head device 155 provides the focus error (focus error) signal or the tracking error signal to an electric circuit 153 in correspondence to the positional relationship with the optical disc 26. The electric circuit 153 provides a signal for microscopically moving the objective lens to the optical head device 155 in response to the focus error signal or the tracking error signal. In response to the signal, the optical head device 155 performs focus servo (control) and the tracking control on the optical disc, and also performs read, write, (record) or erase of the information with respect to the optical head device 155.

The optical information apparatus 157 of the present embodiment is mounted with the optical head device shown in FIG. 12, and thus has an advantage of stably recording or reproducing on a plurality of optical discs having different recording density with a single optical head device.

(Computer)

The computer mounted with the optical information apparatus 167 shown in FIG. 14 will now be described. The computer, the optical disc player, or the optical disc recorder mounted with the optical information apparatus of FIG. 14 or adopting recording and reproducing method described above stably records or reproduces the optical disc of different type, and thus can be used for a wide range of applications.

Figure 15:
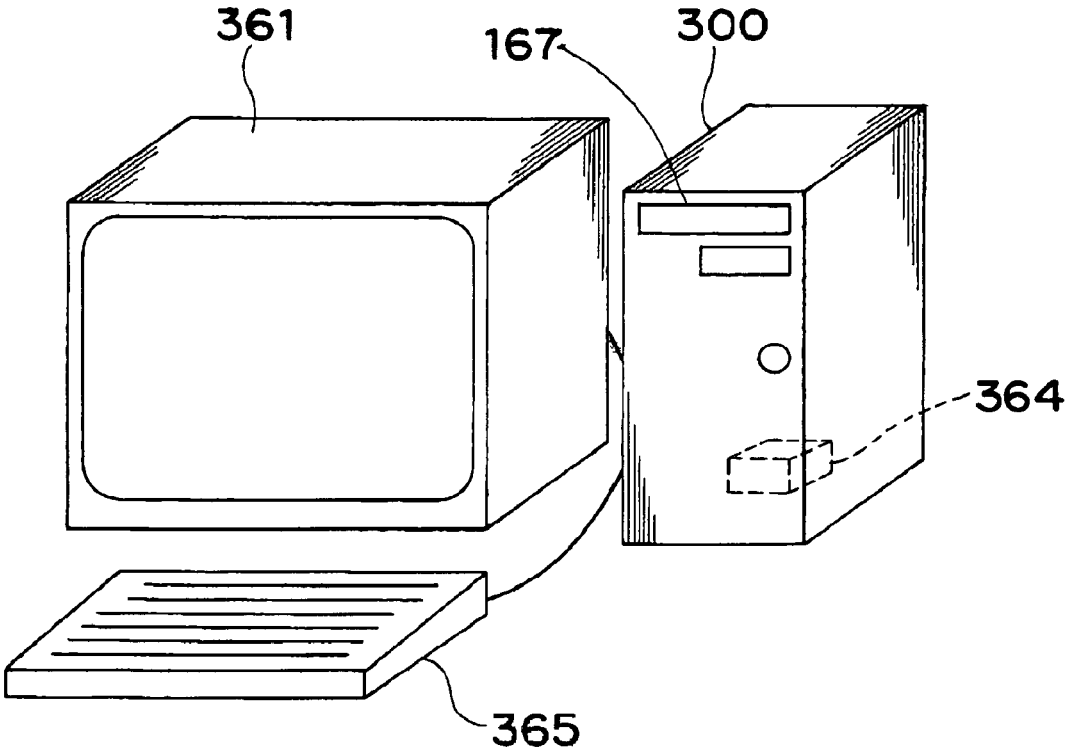
FIG. 15 is a schematic perspective view showing a configuration of a computer mounted with the optical information apparatus of FIG. 14.

In FIG. 15, a computer 300 including the optical information apparatus 167 shown in FIG. 14, an input device 365 such as keyboard, mouse, and touch panel to input information, an arithmetic device 364 such as central processing unit (CPU) for performing calculation based on information input from the input device and the information read from the optical information apparatus 167, and an output device 361 such as Braun tube, liquid crystal display device, and printer for displaying information such as result of calculation by the arithmetic device.

(Optical Disc Player)

Figure 16:
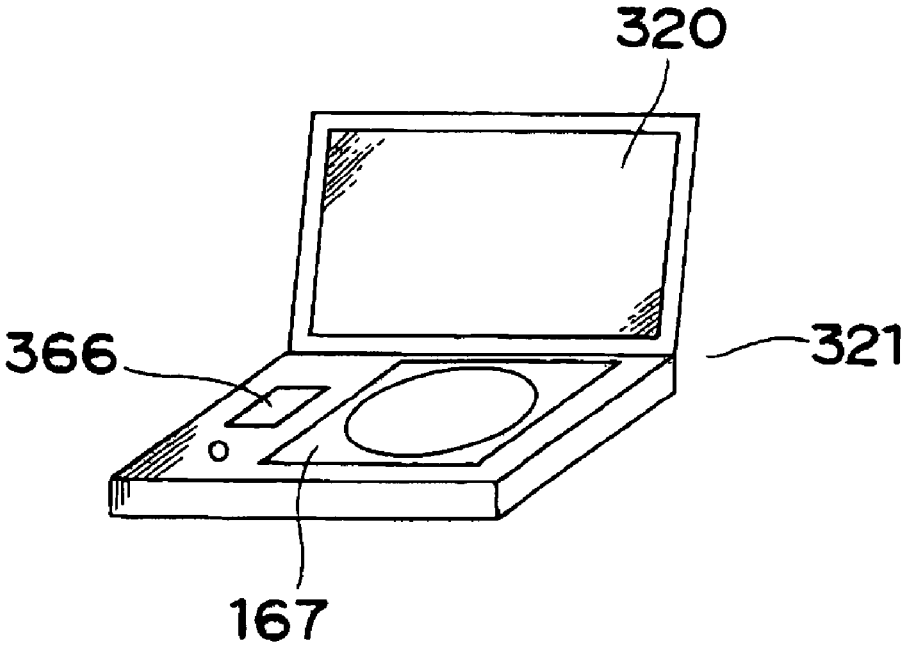
FIG. 16 is a schematic perspective view showing a configuration of an optical disc player and a car navigation system mounted with the optical information apparatus of FIG. 14.

The schematic form configuration of the optical disc player mounted with the optical information apparatus shown in FIG. 14 is shown in FIG. 16. In FIG. 16, the optical disc player 321 including the optical information apparatus 167 shown in FIG. 14, and an information-image conversion device (e.g., decoder 366) for converting information signal obtained from the optical information apparatus to image is configured. This configuration is also used as a car navigation system by adding a position sensor such as GPS and central processing device (CPU). A mode added with the display device 320 such as liquid crystal monitor is also possible.

(Optical Disc Recorder)

Figure 17:
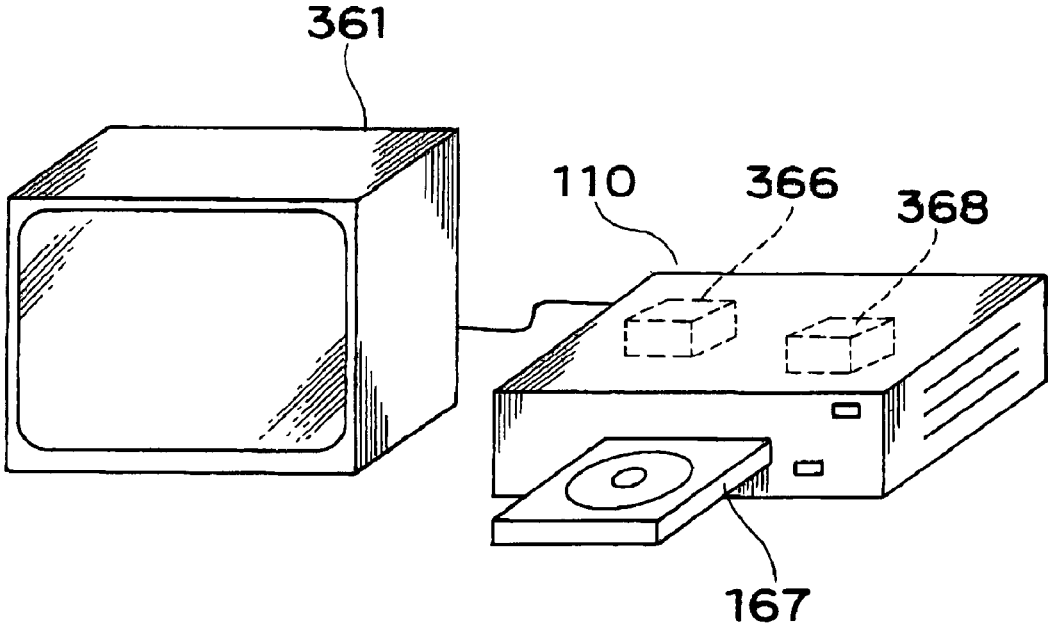
FIG. 17 is a schematic perspective view showing a configuration of an optical disc recorder mounted with the optical information apparatus of FIG. 14.

A schematic form configuration of an optical disc recorder mounted with the optical information apparatus shown in FIG. 14 is shown in FIG. 17. The optical disc recorder shown in FIG. 17 includes an optical information apparatus 167 shown in FIG. 14 and an image-information conversion device (e.g., encoder 368) for converting the image information to the information to be recorded on the optical disc by the optical information apparatus. Desirably, the portion that is already recorded can also be reproduced by including the information-image conversion device (decoder 366) for converting information signal obtained from the optical information apparatus to image. The output device 361 such as Braun tube, liquid crystal display device, printer, and the like for displaying information may also be arranged.

(Vehicle)

Figure 18:
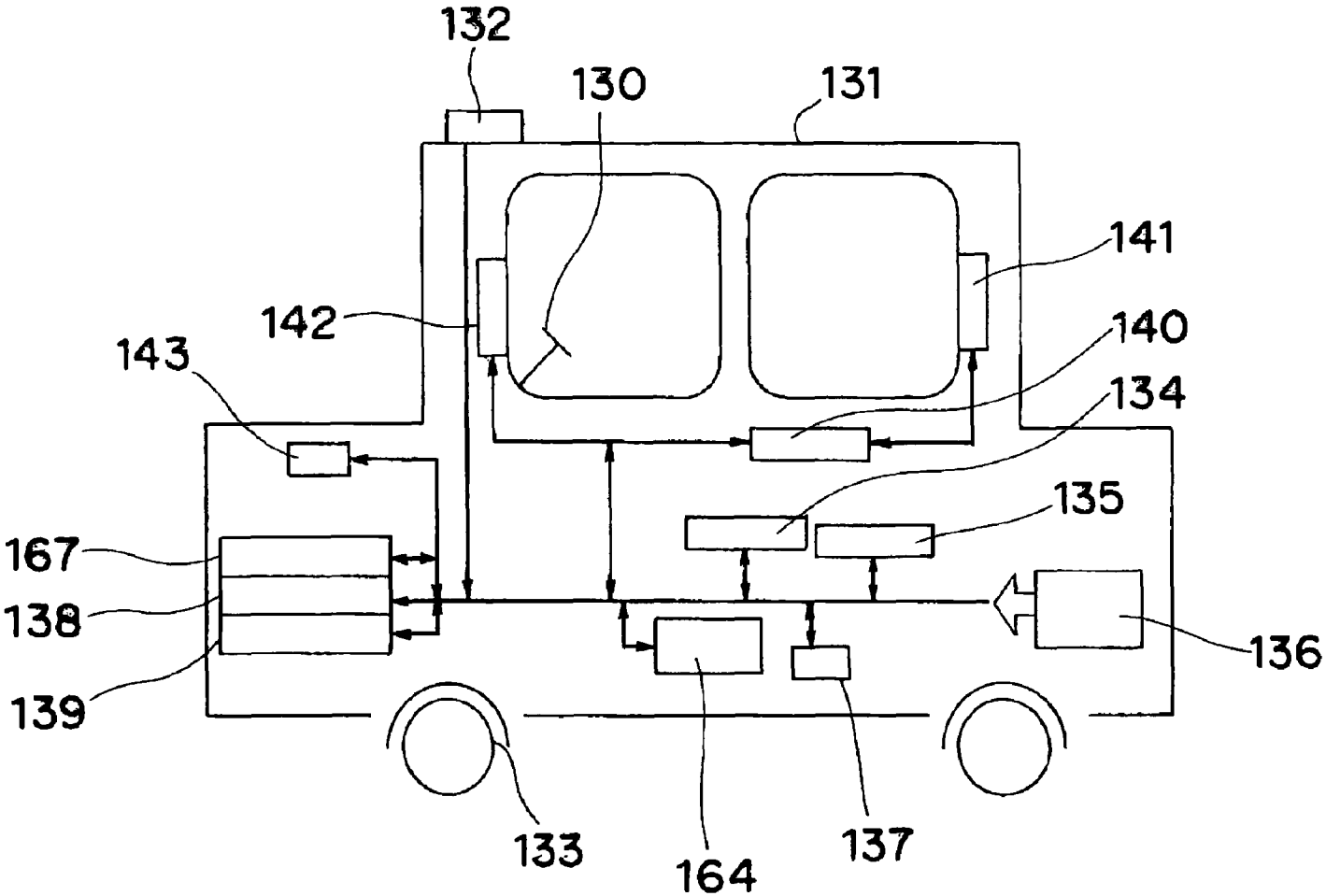
FIG. 18 is an explanatory view showing a configuration of a vehicle mounted with the optical information apparatus of FIG. 14.
Figure 19:
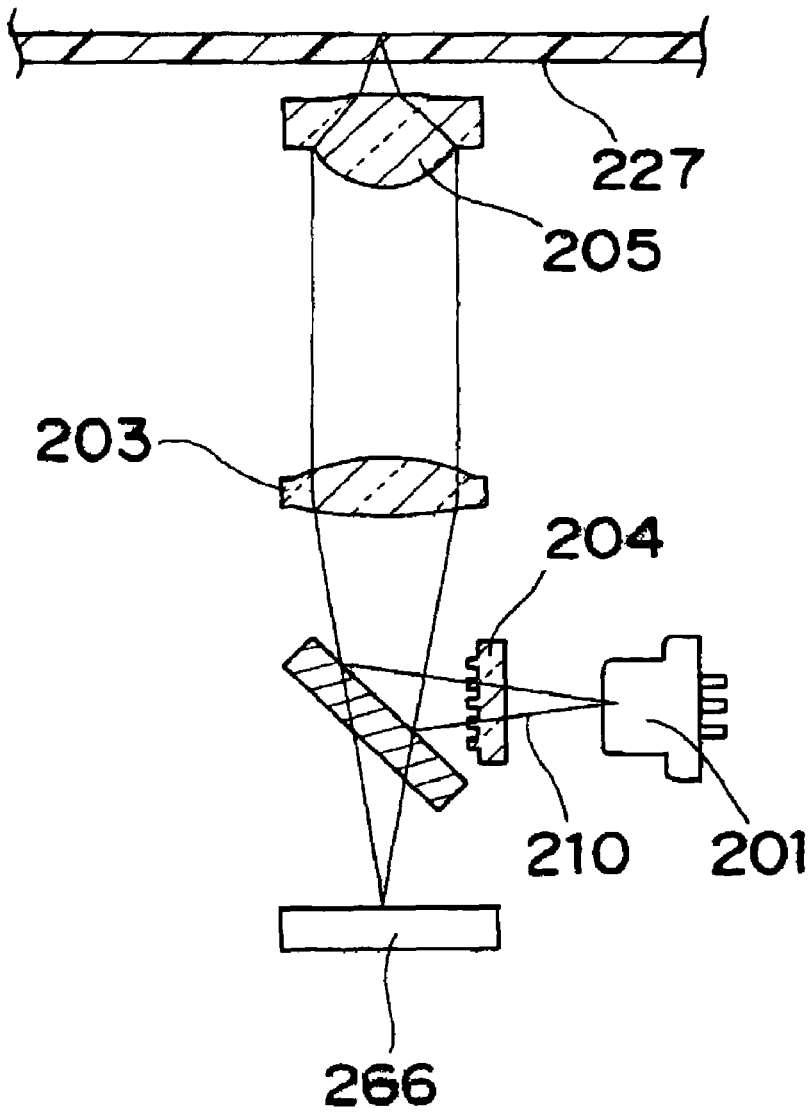
FIG. 19 is a view showing in schematic form a configuration of a conventional optical head device.
Figure 20B:
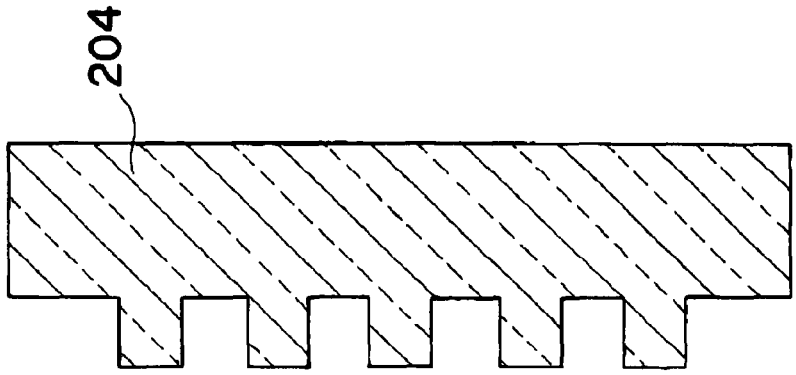
FIG. 20B is a cross sectional view showing a configuration of a diffractive element of the optical head device shown in FIG. 19.
Figure 20A:
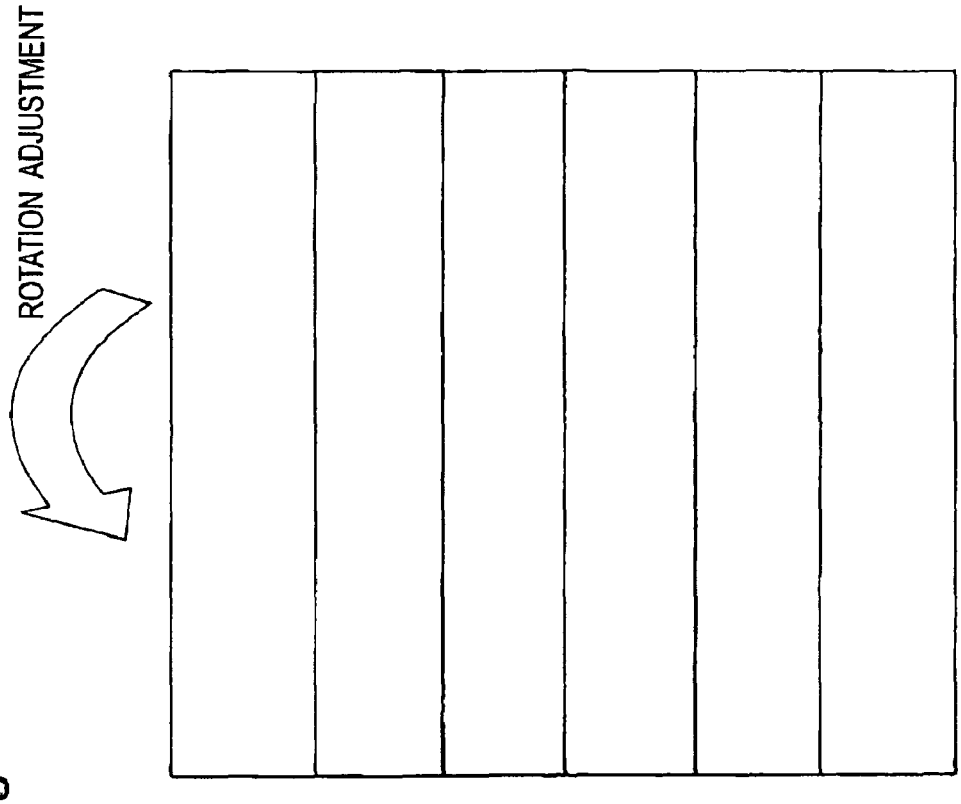
FIG. 20A is a front view showing a configuration of a diffractive element of the optical head device shown in FIG. 19.
Figure 21:
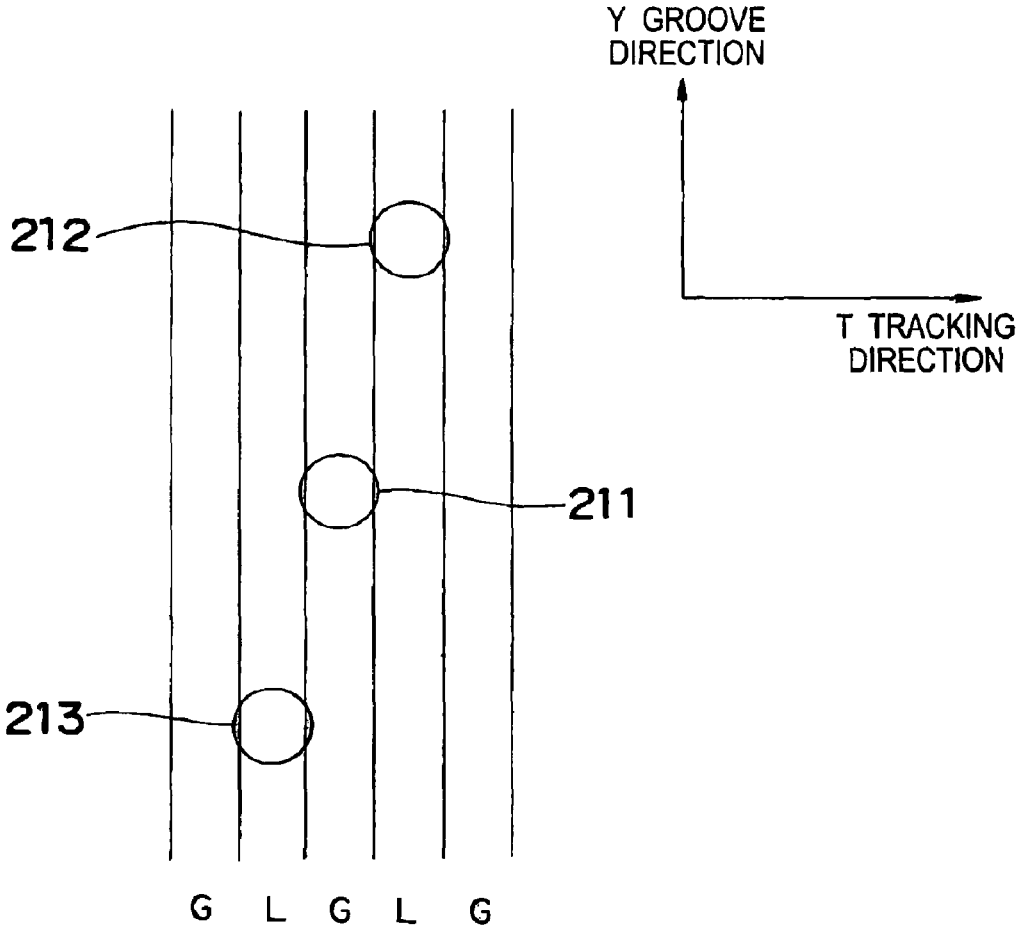
FIG. 21 is an explanatory view of a convergence spot on an optical disc in the conventional optical head device.
Figure 22B:
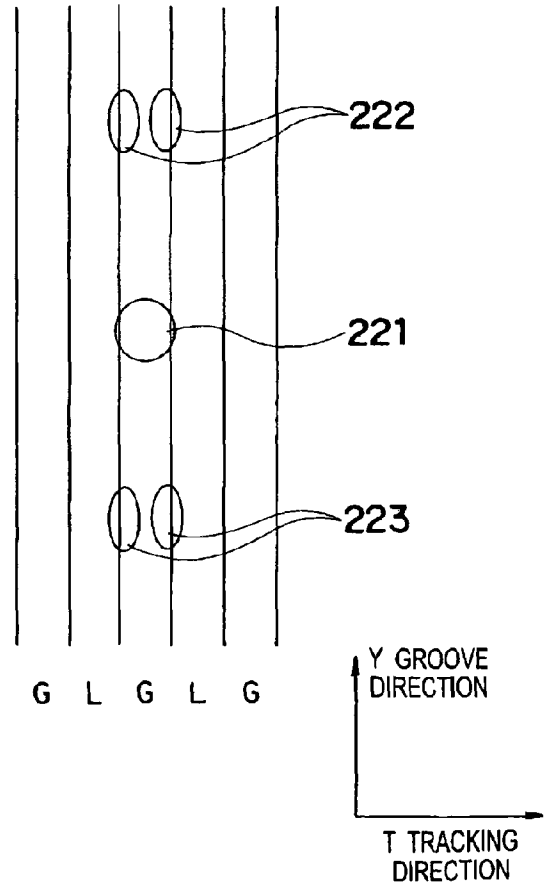
FIG. 22B is an explanatory view of a convergence spot on the optical disc of when the diffraction grating shown in FIG. 22A is used.
Figure 22A:
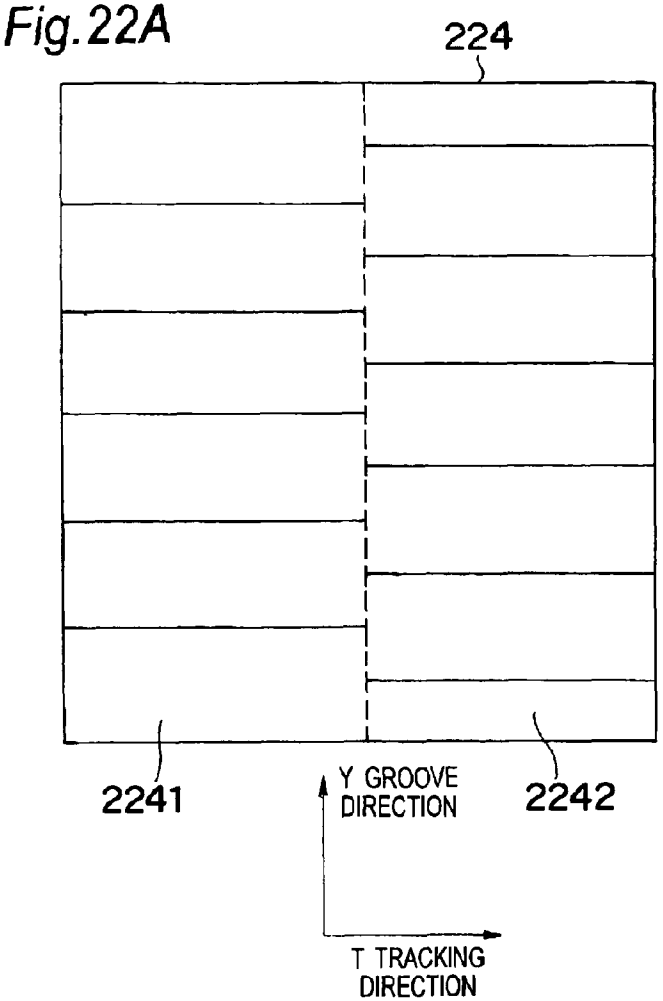
FIG. 22A is a front view showing a configuration of a diffractive element of the conventional optical head device.

The vehicle mounted with the optical information apparatus 167 shown in FIG. 14 will now be described. The schematic form configuration of the vehicle mounted with the optical information apparatus shown in FIG. 14 is shown in FIG. 18. In FIG. 18, the optical information apparatus 167 is the optical information apparatus 167 of FIG. 14. The vehicle body 131 is mounted with the optical information apparatus 167. A power generating unit 134 and a fuel storing unit 135 for storing fuel to be supplied to the power generating unit 134 and/or a power supply 136 are also arranged in the vehicle body 131. Therefore, information can be stably obtained from various types of optical disc while in the moving body by mounting the optical information apparatus 167 of the present application on the vehicle body. Alternatively, the information can be recorded. The vehicle body 131 further includes wheels 133 for traveling in the case of train or automobile. In the case of automobile, a handle 130 for changing directions is arranged.

Furthermore, a great number of optical discs can be readily used by mounting a changer 138 or an optical disc accommodating unit 139 on the vehicle body 131. An arithmetic device 164 for processing the information obtained from the optical disc to obtain an image, a semiconductor memory 137 for temporarily storing the information and a display device 142 may be arranged to enable reproduction of picture information from the optical disc. Audio and music can be reproduced from the optical disc by arranging an amplifier 140 and a speaker 141. With arrangement of a positional sensor such as GPS 132, along with the map information reproduced from the optical disc, the current position and advancing direction can be recognized as image displayed on the display device 142 or audio output from the speaker 141. Furthermore, information from the outside can be received and complementary used with information of the optical disc by arranging a wireless communication unit 143.

The output device 361 and the liquid crystal display monitor 320 are shown in FIGS. 15, 16, and 17, but output terminals may be arranged, where the output device 361 and the liquid crystal monitor 320 obviously may be in separately sold product modes without being arranged therein. The input device is not shown in FIGS. 16 and 17, but a product mode equipped with the input device such as keyboard, touch panel, mouse, remote control device and the like is also possible. The input device may be separately sold, and may be in a mode including only the input terminals.

The optical head device according to the present invention can record and reproduce on a plurality of types of optical discs having different base material thickness, responding wavelength, recording density, and the like, and a compatible optical information apparatus using the optical head device can handle optical disc of various standards such as CD, DVD, and BD. Therefore, the application can be expanded to various systems for storing information such as computer, optical disc player, optical disc recorder, car navigation system, edit system, data server, AV component, vehicle, and the like.

The respective advantages are obtained by appropriately combining arbitrary embodiments of the various embodiments described above.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical head device comprising a light source, a diffractive element for branching light exiting from the light source into at least three light fluxes including a main beam that is transmitted without being diffracted and two sub-beams that are diffracted, an objective lens for converging the three light fluxes on a recording surface of an optical disc, and a light detector for receiving the light converged on the recording surface of the optical disc by the objective lens and reflected by the optical disc and photoelectric converting the light to an electrical signal;

wherein the diffractive element is divided into a first diffraction grating region formed with a first diffraction grating, a second diffraction grating region formed with a second diffraction grating having a phase differing by substantially 180 degrees from the first diffraction grating, and a central region sandwiched by the first diffraction grating region and the second diffraction grating region;

wherein the central region is divided into a plurality of divided regions by a virtual dividing line; and wherein the central region has phases or grating vectors different from the first diffraction grating region and the second diffraction grating region, and the divided regions divided by the dividing line are formed with diffraction gratings having different phases and grating vectors from each other.

2. [The optical head device according to claim 1,] *An optical head device comprising a light source, a diffractive element for branching light exiting from the light source into at least three light fluxes including a main beam that is transmitted without being diffracted and two sub-beams that are diffracted, an objective lens for converging the three light fluxes on a recording surface of an optical disc, and a light detector for receiving the light converged on the recording surface of the optical disc by the objective lens and reflected by the optical disc and photoelectric converting the light to an electrical signal;*

*wherein the diffractive element is divided into a first diffraction grating region formed with a first diffraction grating, a second diffraction grating region formed with a second diffraction grating having a phase differing by substantially 180 degrees from the first diffraction grating, and a central region sandwiched by the first diffraction grating region and the second diffraction grating region;*

*wherein the central region is divided into a plurality of divided regions by a virtual dividing line;*

*wherein the central region has phases or grating vectors different from the first diffraction grating region and the second diffraction grating region, and the divided regions divided by the dividing line are formed with diffraction gratings having different phases or grating vectors from each other; and* wherein the dividing line dividing the central region extends in a direction orthogonal to an extending direction of a track groove of the optical disc.

3. [The optical head device according to claim 1,] *An optical head device comprising a light source, a diffractive element for branching light exiting from the light source into at least three light fluxes including a main beam that is transmitted without being diffracted and two sub-beams that are diffracted, an objective lens for converging the three light fluxes on a recording surface of an optical disc, and a light detector for receiving the light converged on the recording surface of the optical disc by the objective lens and reflected by the optical disc and photoelectric converting the light to an electrical signal;*

*wherein the diffractive element is divided into a first diffraction grating region formed with a first diffraction grating, a second diffraction grating region formed with a second diffraction grating having a phase differing by substantially 180 degrees from the first diffraction grating, and a central region sandwiched by the first diffraction grating region and the second diffraction grating region;*

*wherein the central region is divided into a plurality of divided regions by a virtual dividing line;*

*wherein the central region has phases or grating vectors different from the first diffraction grating region and the second diffraction grating region, and the divided regions divided by the dividing line are formed with diffraction gratings having different phases or grating vectors from each other; and* wherein the central region is divided into three or more divided regions.

4. The optical head device according to claim 3, wherein diffraction gratings having different phases from each other are formed in two divided regions of the three or more divided regions of the central region; and a diffraction grating of the same grating vector and the same phase as the diffraction grating formed in one of the two divided regions is formed in remaining divided region of the three or more divided regions.

5. [The optical head device according to claim 1,] *An optical head device comprising a light source, a diffractive element for branching light exiting from the light source into at least three light fluxes including a main beam that is transmitted without being diffracted and two sub-beams that are diffracted, an objective lens for converging the three light fluxes on a recording surface of an optical disc, and a light detector for receiving the light converged on the recording surface of the optical disc by the objective lens and reflected by the optical disc and photoelectric converting the light to an electrical signal;*

*wherein the diffractive element is divided into a first diffraction grating region formed with a first diffraction grating, a second diffraction grating region formed with a second diffraction grating having a phase differing by substantially 180 degrees from the first diffraction grating, and a central region sandwiched by the first diffraction grating region and the second diffraction grating region;*

*wherein the central region is divided into a plurality of divided regions by a virtual dividing line;*

*wherein the central region has phases or grating vectors different from the first diffraction grating region and the second diffraction grating region, and the divided regions divided by the dividing line are formed with diffraction gratings having different phases or grating vectors from each other; and* wherein when the phase of the first diffraction grating formed in the first diffraction grating region is 0 degrees as a reference, the phase of a third diffraction grating formed in the divided region obtained by dividing the central region and the phase of a fourth diffraction grating formed in another divided region have opposite polarities but the same absolute value.

6. The optical head device according to claim 5, wherein when the phase of the first diffraction grating formed in the first divided region is 0 degrees as a reference, the phase of the third diffraction grating is 90 degrees, and the phase of the fourth diffraction grating is −90 degrees.

7. [The optical head device according to claim 1,] *An optical head device comprising a light source, a diffractive element for branching light exiting from the light source into at least three light fluxes including a main beam that is transmitted without being diffracted and two sub-beams that are diffracted, an objective lens for converging the three light fluxes on a recording surface of an optical disc, and a light detector for receiving the light converged on the recording surface of the optical disc by the objective lens and reflected by the optical disc and photoelectric converting the light to an electrical signal;*

*wherein the diffractive element is divided into a first diffraction grating region formed with a first diffraction grating, a second diffraction grating region formed with a second diffraction grating having a phase differing by substantially 180 degrees from the first diffraction grating, and a central region sandwiched by the first diffraction grating region and the second diffraction grating region;*

*wherein the central region is divided into a plurality of divided regions by a virtual dividing line;*

*wherein the central region has phases or grating vectors different from the first diffraction grating region and the second diffraction grating region, and the divided regions divided by the dividing line are formed with diffraction gratings having different phases or grating vectors from each other; and* wherein when the phase of the first diffraction grating formed in the first diffraction grating region is 0 degrees as a reference, the phase of each diffraction grating formed in each divided region of the central region is substantially 0 degrees on average.

8. The optical head device according to claim 3, wherein when the phase of the first diffraction grating formed in the first divided region is 0 degrees as a reference, the central region is divided into four or more divided regions, and includes a diffraction grating having a phase of −120 degrees, a diffraction grating having a phase of −60 degrees, a diffraction grating having a phase of +60 degrees, and a diffraction grating having a phase of +120 degrees.

[9. The optical head device according to claim 1, wherein the width of the central region is 10% to 40% of a projection diameter on the diffractive element of an effective diameter of the objective lens.]

[10. The optical head device according to claim 1, wherein the light source is a two wavelength light source for emitting a red light and an infrared light.]

[11. The optical head device according to claim 10, wherein the width of the central region is less than or equal to 30% of a projection diameter on the diffractive element of an opening effective diameter of the objective lens.]

[12. The optical head device according to claim 1, further comprising a blue light source.]

[13. A diffractive element mounted on an optical head device including a light source, an objective lens for converging light exiting from the light source on a recording surface of an optical disc, and a light detector for receiving the light converged on the recording surface of the optical disc by the objective lens and reflected by the optical disc and photoelectric converting the light to an electrical signal, the diffractive element branching the light exiting from the light source into at least three light fluxes including a main beam that is transmitted without being diffracted and two sub-beams that are diffracted;

wherein the diffractive element is divided into a first diffraction grating region formed with a first diffraction grating, a second diffraction grating region formed with a second diffraction grating having a phase differing by substantially 180 degrees from the first diffraction grating and a central region sandwiched by the first diffraction grating region and the second diffraction grating region;

wherein the central region is divided into a plurality of divided regions by a virtual dividing line; and wherein the central region has phases or grating vectors different from the first diffraction grating region and the second diffraction grating region, and the divided regions divided by the dividing line are formed with diffraction gratings having different phases and grating vectors from each other.]

[14. The diffractive element according to claim 13, wherein the dividing line dividing the central region extends in a direction orthogonal to an extending direction of a track groove of the optical disc.]

[15. The diffractive element according to claim 13, wherein the central region is divided into three or more divided regions.]

[16. The diffractive element according to claim 15, wherein diffraction gratings having different phases from each other are formed in two divided regions of the three or more divided regions of the central region; and a diffraction grating of the same grating vector and the same phase as the diffraction grating formed in one of the two divided regions is formed in remaining divided region of the three or more divided regions.]

17. [The diffractive element according to claim 13,] *A diffractive element mounted on an optical head device including a light source, an objective lens for converging light exiting from the light source on a recording surface of an optical disc, and a light detector for receiving the light converged on the recording surface of the optical disc by the objective lens and reflected by the optical disc and photoelectric converting the light to an electrical signal, the diffractive element branching the light exiting from the light source into at least three light fluxes including a main beam that is transmitted without being diffracted and two sub-beams that are diffracted;*

*wherein the diffractive element is divided into a first diffraction grating region formed with a first diffraction grating, a second diffraction grating region formed with a second diffraction grating having a phase differing by substantially 180 degrees from the first diffraction grating and a central region sandwiched by the first diffraction grating region and the second diffraction grating region;*

*wherein the central region is divided into a plurality of divided regions by a virtual dividing line;*

*wherein the central region has phases or grating vectors different from the first diffraction grating region and the second diffraction grating region, and the divided regions divided by the dividing line are formed with diffraction gratings having different phases or grating vectors from each other; and* wherein when the phase of the first diffraction grating formed in the first diffraction grating region is 0 degrees as a reference, the phase of a third diffraction grating formed in the divided region obtained by dividing the central region and the phase of a fourth diffraction grating formed in another divided region have opposite polarities but the same absolute value.

18. The diffractive element according to claim 17, wherein when the phase of the first diffraction grating formed in the first divided region is 0 degrees as a reference, the phase of the third diffraction grating is 90 degrees, and the phase of the fourth diffraction grating is −90 degrees.

19. [The diffractive element according to claim 13,] *A diffractive element mounted on an optical head device including a light source, an objective lens for converging light exiting from the light source on a recording surface of an optical disc, and a light detector for receiving the light converged on the recording surface of the optical disc by the objective lens and reflected by the optical disc and photoelectric converting the light to an electrical signal, the diffractive element branching the light exiting from the light source into at least three light fluxes including a main beam that is transmitted without being diffracted and two sub-beams that are diffracted;*

*wherein the diffractive element is divided into a first diffraction grating region formed with a first diffraction*

*grating, a second diffraction grating region formed with a second diffraction grating having a phase differing by substantially 180 degrees from the first diffraction grating and a central region sandwiched by the first diffraction grating region and the second diffraction grating region;*

*wherein the central region is divided into a plurality of divided regions by a virtual dividing line;*

*wherein the central region has phases or grating vectors different from the first diffraction grating region and the second diffraction grating region, and the divided regions divided by the dividing line are formed with diffraction gratings having different phases or grating vectors from each other; and* wherein when the phase of the first diffraction grating formed in the first diffraction grating region is 0 degrees as a reference, the phase of each diffraction grating formed in each divided region of the central region is substantially 0 degrees on average.

20. [The diffractive element according to claim 16.] *A diffractive element mounted on an optical head device including a light source, an objective lens for converging light exiting from the light source on a recording surface of an optical disc, and a light detector for receiving the light converged on the recording surface of the optical disc by the objective lens and reflected by the optical disc and photoelectric converting the light to an electrical signal, the diffractive element branching the light exiting from the light source into at least three light fluxes including a main beam that is transmitted without being diffracted and two sub-beams that are diffracted;*

*wherein the diffractive element is divided into a first diffraction grating region formed with a first diffraction grating, a second diffraction grating region formed with a second diffraction grating having a phase differing by substantially 180 degrees from the first diffraction grating and a central region sandwiched by the first diffraction grating region and the second diffraction grating region;*

*wherein the central region is divided into a plurality of divided regions by a virtual dividing line;*

*wherein the central region has phases or grating vectors different from the first diffraction grating region and the second diffraction grating region, and the divided regions divided by the dividing line are formed with diffraction gratings having different phases or grating vectors from each other;*

*wherein the central region is divided into three or more divided regions;*

*wherein diffraction gratings having different phases from each other are formed in two divided regions of the three or more divided regions of the central region;*

*wherein a diffraction grating of the same grating vector and the same phase as the diffraction grating formed in one of the two divided regions is formed in remaining divided region of the three or more divided regions; and* wherein when the phase of the first diffraction grating formed in the first divided region is 0 degrees as a reference, the central region is divided into four or more regions, and includes a diffraction grating having a phase of −120 degrees, a diffraction grating having a phase of −60 degrees, a diffraction grating having a phase of +60 degrees, and a diffraction grating having a phase of +120 degrees.

21. An optical information apparatus comprising:

the optical head device according to claim 1;

a motor for rotating an optical disc; and an electric circuit for receiving a signal obtained from the optical head device, and controlling and driving the motor, an optical lens, and a laser light source based on the signal.

22. The optical information apparatus according to claim 21, wherein a push-pull signal obtained by receiving the sub-beam at the light detector and calculating through photoelectric conversion is amplified at an amplification factor K1, and subtracted with a push-pull signal obtained by receiving the sub-beam at the light detector and being processed through photoelectric conversion to be used as a tracking error signal; and the amplification factor K1 is fixed after being adjusted to a value in which change in tracking control signal becomes smaller when the objective lens is moved in a direction perpendicular to an extending direction of a track groove of the optical disc.

23. The optical information apparatus according to claim 21, wherein a focus error signal obtained by receiving the sub-beam at the light detector and calculating through photoelectric conversion is amplified at an amplification factor K2, and added with a focus error signal obtained by receiving the sub-beam at the light detector and being processed through photoelectric conversion to be used as a focus error signal for focus control.

24. A computer comprising:

the optical information apparatus according to claim 1;

an input device or an input terminal for inputting the information;

an arithmetic device for performing an arithmetic operation based on information input from the input device or information reproduced from the optical information apparatus; and an output device or an output terminal for displaying or outputting the information input from the input device or the information reproduced from the optical information apparatus, or result of arithmetic performed by the arithmetic device.

25. An optical disc player comprising:

the optical information apparatus according to claim 21; and an information-image decoder for converting information signal obtained from the optical information apparatus to an image.

26. A car navigation system comprising:

the optical information apparatus according to claim 21;

an information-image decoder for converting information signal obtained from the optical information apparatus to an image; and a position sensor.

27. An optical disc recorder comprising:

the optical information apparatus according to claim 21; and an image-information encoder for converting image information to information to be recorded by the optical information apparatus.

28. A vehicle comprising the optical information apparatus according to claim 21, a vehicle body mounted with the optical information apparatus, and a power generating unit for generating power to move the vehicle body.

*29. An optical information apparatus comprising:*
*the optical head device according to claim 2;*
*a motor for rotating an optical disc; and*
*an electric circuit for receiving a signal obtained from the optical head device, and controlling and driving the motor, an optical lens, and a laser light source based on the signal.*

*30. An optical information apparatus comprising:*
*the optical head device according to claim 3;*
*a motor for rotating an optical disc; and*
*an electric circuit for receiving a signal obtained from the optical head device, and controlling and driving the motor, an optical lens, and a laser light source based on the signal.*

*31. An optical information apparatus comprising:*
*the optical head device according to claim 4;*
*a motor for rotating an optical disc; and*
*an electric circuit for receiving a signal obtained from the optical head device, and controlling and driving the motor, an optical lens, and a laser light source based on the signal.*

*32. An optical information apparatus comprising:*
*the optical head device according to claim 5;*
*a motor for rotating an optical disc; and*
*an electric circuit for receiving a signal obtained from the optical head device, and controlling and driving the motor, an optical lens, and a laser light source based on the signal.*

*33. An optical information apparatus comprising:*
*the optical head device according to claim 6;*
*a motor for rotating an optical disc; and*
*an electric circuit for receiving a signal obtained from the optical head device, and controlling and driving the motor, an optical lens, and a laser light source based on the signal.*

*34. An optical information apparatus comprising:*
*the optical head device according to claim 7;*
*a motor for rotating an optical disc; and*
*an electric circuit for receiving a signal obtained from the optical head device, and controlling and driving the motor, an optical lens, and a laser light source based on the signal.*

*35. An optical information apparatus comprising:*
*the optical head device according to claim 8;*
*a motor for rotating an optical disc; and*
*an electric circuit for receiving a signal obtained from the optical head device, and controlling and driving the motor, an optical lens, and a laser light source based on the signal.*

* * * * *